United States Patent
Toyoda et al.

(10) Patent No.: US 9,153,015 B2
(45) Date of Patent: Oct. 6, 2015

(54) IMAGE PROCESSING DEVICE AND METHOD

(75) Inventors: Yoshitaka Toyoda, Tokyo (JP); Daisuke Suzuki, Tokyo (JP); Koichi Yamashita, Tokyo (JP); Takashi Ito, Tokyo (JP); Narihiro Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 183 days.

(21) Appl. No.: 14/002,144

(22) PCT Filed: Jan. 31, 2012

(86) PCT No.: PCT/JP2012/052083
§ 371 (c)(1),
(2), (4) Date: Aug. 29, 2013

(87) PCT Pub. No.: WO2012/127904
PCT Pub. Date: Sep. 27, 2012

(65) Prior Publication Data
US 2013/0336596 A1     Dec. 19, 2013

(30) Foreign Application Priority Data

Mar. 24, 2011  (JP) ................................. 2011-065629

(51) Int. Cl.
*G06T 5/20* (2006.01)
*H04N 5/21* (2006.01)
*G06T 5/00* (2006.01)

(52) U.S. Cl.
CPC . *G06T 5/20* (2013.01); *G06T 5/002* (2013.01); *G06T 5/008* (2013.01); *H04N 5/21* (2013.01); *G06T 2207/20182* (2013.01)

(58) Field of Classification Search
CPC . G06T 5/20; G06T 2207/10024; G06T 5/002; G06T 5/007; G06T 2207/20012; G06T 5/008; G06T 5/009; G06T 5/40; G06T 5/10; G06T 5/50; G06T 7/0085; H04N 1/58; H04N 5/357; H04N 9/646; H04N 5/21
See application file for complete search history.

(56) References Cited

U.S. PATENT DOCUMENTS 5,838,835 A * 11/1998 Martens ......................... 382/274
5,930,402 A *  7/1999 Kim ............................. 382/274

(Continued)

FOREIGN PATENT DOCUMENTS

EP        1345170 A1     9/2003
EP        1708490 A1    10/2006

(Continued)

*Primary Examiner* — Jingge Wu
(74) *Attorney, Agent, or Firm* — Birch, Stewart, Kolasch & Birch, LLP

(57) ABSTRACT

For each pixel in an image (Din), a contrast correlation value (CT) is detected for peripheral areas centered around the pixel to be corrected (1), a contrast enhancement coefficient (Ken) is determined in accordance with the contrast correlation value (CT) (2), and in accordance with the enhancement coefficient (Ken), local contrast is enhanced for each pixel and an intermediate image (D3) is generated (3). When performing noise reduction (5) by smoothing the intermediate image (D3) in the time direction, the degree of noise reduction is controlled in accordance with a noise reduction coefficient (Knr) that is large where the enhancement coefficient (Ken) is large. With respect to a low-contrast image such as one captured under fog, haze or other poor weather conditions, the contrast in areas having reduced contrast is appropriately improved, and the noise that is enhanced in conjunction with contrast improvement is reduced, enabling a high quality image to be obtained.

13 Claims, 11 Drawing Sheets

(56) References Cited

U.S. PATENT DOCUMENTS

| | | | |
|---|---|---|---|
| 5,978,518 A * | 11/1999 | Oliyide et al. | 382/260 |
| 6,078,686 A * | 6/2000 | Kim | 382/167 |
| 7,778,478 B2 * | 8/2010 | Kuniba | 382/254 |
| 8,014,034 B2 * | 9/2011 | Hooper | 358/3.27 |
| 8,023,733 B2 * | 9/2011 | Monobe et al. | 382/168 |
| 8,072,511 B2 * | 12/2011 | Masaoka et al. | 348/241 |
| 8,111,895 B2 * | 2/2012 | Spahn | 382/132 |
| 8,170,345 B2 * | 5/2012 | Morita | 382/195 |
| 8,233,548 B2 * | 7/2012 | Fukuda | 375/240.26 |
| 8,238,687 B1 * | 8/2012 | Lim et al. | 382/274 |
| 8,594,444 B2 * | 11/2013 | Geiger et al. | 382/240 |
| 8,639,050 B2 * | 1/2014 | Gupta et al. | 382/261 |
| 2001/0038716 A1 | 11/2001 | Tsuchiya et al. | |
| 2003/0001975 A1 | 1/2003 | Takeda et al. | |
| 2007/0286481 A1 | 12/2007 | Monobe et al. | |
| 2010/0111414 A1 | 5/2010 | Aragaki et al. | |
| 2010/0194934 A1 | 8/2010 | Fukutomi | |
| 2011/0019096 A1 | 1/2011 | Lee et al. | |

FOREIGN PATENT DOCUMENTS

| | | |
|---|---|---|
| JP | 2000-115632 A | 4/2000 |
| JP | 2001-298621 A | 10/2001 |
| JP | 2004-342030 A | 12/2004 |
| JP | 2008-17458 A | 1/2008 |
| JP | 2008-171059 A | 7/2008 |
| JP | 2008-199448 A | 8/2008 |
| JP | 2009-5252 A | 1/2009 |
| JP | 2010-183182 A | 8/2010 |
| JP | 2010-220030 A | 9/2010 |

* cited by examiner

Δd

Δd

Ken × Δd

Ken × Δd

Δd

Δd

Δd

Ken × Δd

Ken × Δd

IMAGE PROCESSING DEVICE AND METHOD

TECHNICAL FIELD

The present invention relates to an image processing device and method that correct the contrast of an image, more particularly to a process that improves image contrast and sharpness to increase the visibility of a low-contrast image captured under bad weather conditions such as fog or haze, and reduce the enhanced noise produced thereby.

BACKGROUND ART

Various contrast enhancement methods have been proposed as techniques for generating a sharp image by correcting a low-contrast image.

The gradation correction device described in Patent Document 1, for example, generates a luminance signal from primary color signals, detects information about the distribution of the generated luminance signal over the entire screen, creates a gradation correction conversion table for smoothing the histogram distribution over the entire range of luminance levels, calculates correction coefficients based on the input/output ratio of the gradation correction conversion table, and multiples each primary color signal by the same correction coefficients, thereby raising the contrast of the entire image.

The image processor described in Patent Document 2 generates smoothed image data in which edge components of the input image data are preserved, then amplifies the differences between the input image data and smoothed image data and adds them to the smoothed image data to enhance the contrast of high-frequency components of the image.

The general aim of the above contrast enhancement processes is to widen the range of the luminance distribution in the image as a whole or in local areas. A problem with stretching the range of the luminance distribution, however, has been that it amplifies not only the signal but also noise in the stretched luminance levels, impairing the quality of the image.

After gradation correction of an image, the imaging apparatus in Patent Document 3 accordingly separates the image into a plurality of frequency components by means of a wavelet transformation and reduces noise by coring the plurality of frequency components, setting the coring thresholds on the basis of the gradation correction curve so that noise components are suppressed according to the degree to which noise is amplified during the gradation correction.

PRIOR ART REFERENCES

Patent References

Patent Document 1: Japanese Patent Application Publication No. 2004-342030 (paragraphs 0036-0072)
Patent Document 2: Japanese Patent Application Publication No. 2001-298621 (paragraphs 0008-0041)
Patent Document 3: Japanese Patent Application Publication No. 2008-199448 (paragraphs 0025-0083)

SUMMARY OF THE INVENTION

Problems to be Solved by the Invention

When the contrast of the image signal is extremely low, however, and the signal amplitude is of about the same as the noise amplitude, the image device described in Patent Document 3 is unable to set appropriate coring thresholds for noise reduction, and cannot adequately amplify the signal while clipping the noise. In particular, in a foggy or hazy image, to amplify the subject signal to the visible level in places such as distant scenes with extremely reduced contrast, the contrast range must be multiplied by a factor of ten or more, and if the signal amplitude of the subject is about the same as the noise amplitude, the noise is also amplified by a factor of ten or more, so that there has been the problem of noise that would normally not be noticed becoming visible and degrading the quality of the image.

In addition, since the imaging apparatus described in Patent Document 3 removes high frequency components in order to reduce noise, edge blur occurs. Accordingly, if it is combined with the method of improving contrast in local areas of an image described in Patent Document 2, there is the problem that after contrast enhancement in the high-frequency components of an image, the high-frequency components are attenuated to reduce noise; the two effects cancel each other out. In a foggy or hazy image, in particular, while contrast enhancement produces a dehazing effect, since edges are blurred by noise reduction, the image appears hazy again.

The present invention addresses the problems of the above prior art with the object of providing an image processing device and method that can suitably enhance the contrast of low contrast parts of an image captured under poor weather conditions such as fog and haze, and reduce the noise that is also enhanced when the contrast is enhanced, thereby obtaining a high definition image.

Means for Solving the Problem

An image processing device according to one aspect of the invention comprises:

a low contrast area detection means that takes each pixel of an input image as a pixel to be corrected and detects a contrast correlation value of a surrounding area of the pixel to be corrected in the input image;

an enhancement coefficient determination means that determines a contrast enhancement coefficient for the pixel to be corrected according to the contrast correlation value detected by the low contrast area detection means;

a local contrast enhancement means that enhances contrast of a local area of the pixel to be corrected in the input image according to the enhancement coefficient determined by the enhancement coefficient determination means and outputs a local contrast enhanced image;

a noise reduction coefficient generation means that generates a noise reduction coefficient that increases as the enhancement coefficient determined by the enhancement coefficient determination means increases; and a 3-D noise reduction means that performs noise reduction of a noise component of the pixel to be corrected by smoothing the local contrast enhanced image in a time direction over a plurality of frames; wherein the 3-D noise reduction means controls a degree of the noise reduction for the pixel to be corrected according to the noise reduction coefficient generated by the noise reduction coefficient generation means.

An image processing device according to another aspect of the invention comprises:

a 3-D noise reduction means that takes each pixel in an input image as a pixel to be corrected and smoothes the input image in a time direction over a plurality of frames, thereby performing noise reduction of a noise component of the pixel to be corrected, and outputs a 3-D noise-reduced image;

a low contrast area detection means that detects a contrast correlation value of a surrounding area of the pixel to be corrected in the 3-D noise-reduced image;

an enhancement coefficient determination means that determines a contrast enhancement coefficient for the pixel to be corrected according to the contrast correlation value detected by the low contrast area detection means;

a local contrast enhancement means that enhances contrast of a local area of the pixel to be corrected in the 3-D noise-reduced image according to the enhancement coefficient determined by the enhancement coefficient determination means and outputs a local contrast enhanced image signal;

a noise reduction coefficient generation means that generates a noise reduction coefficient that increases as the enhancement coefficient determined by the enhancement coefficient determination means increases; and a first frame memory that stores the noise reduction coefficients generated in the enhancement coefficient determining means for the pixels in one frame; wherein the 3-D noise reduction means controls a degree of the noise reduction for the pixel to be corrected according to the noise reduction coefficients stored in the first frame memory for each pixel one frame before.

Effects of the Invention

According to the present invention, a noise reduction coefficient for reducing noise can be set according to a coefficient for enhancing local contrast, so that noise can be suitably reduced according to the degree to which noise is amplified during local contrast enhancement.

Since the present invention also provides a 3-D noise reduction means for smoothing noise components over a plurality of frames of an image in the time direction, it can reduce random noise components alone without attenuating the amplitude of an enhanced subject signal. Furthermore, noise can be reduced without causing edge blur in still images.

Accordingly, the contrast of parts with reduced contrast in a low-contrast image captured under poor weather conditions such as fog or haze can be suitably enhanced, and the noise that is also enhanced when the contrast is enhanced can be reduced, whereby a high definition image can be obtained.

MODE FOR CARRYING OUT THE INVENTION

First Embodiment

Figure 1:
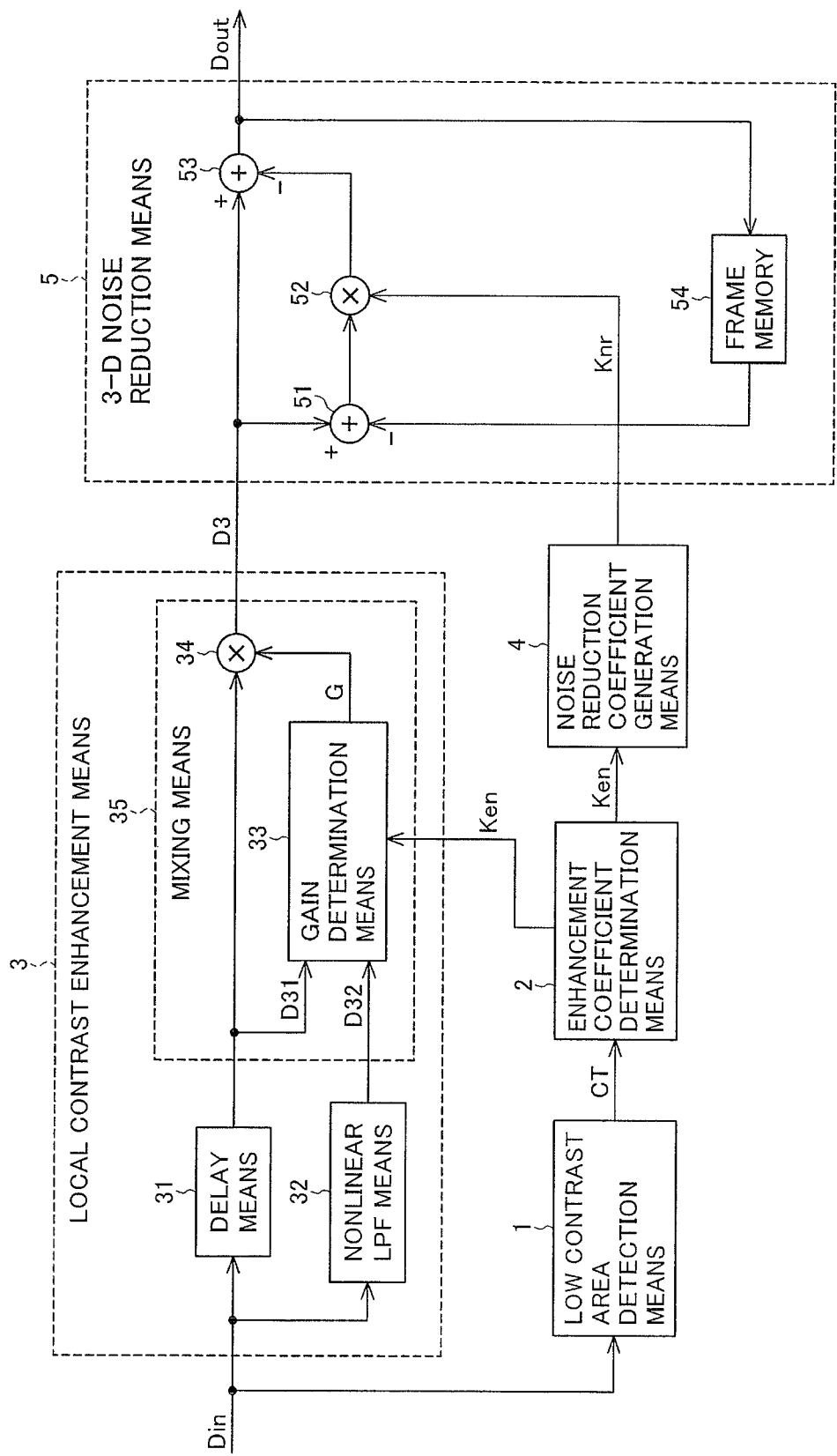
FIG. 1 is a block diagram showing the configuration of the image processing device according to a first embodiment of the invention.

FIG. 1 is a block diagram showing the configuration of the image processing device according to the first embodiment of the invention. The image processing device according to the first embodiment includes a low contrast area detection means 1, an enhancement coefficient determination means 2, a local contrast enhancement means 3, a noise reduction coefficient generation means 4, and a 3-D noise reduction means 5.

The low contrast area detection means 1 receives an input image signal representing an input image Din and, for each pixel in the input image Din, detects a contrast correlation value CT of a surrounding area centered on the pixel to be corrected. The input image and the input image signal representing it will be denoted by the same symbol Din. Other signals will be similarly denoted below.

The enhancement coefficient determination means 2 determines a contrast enhancement coefficient Ken for each pixel according to the contrast correlation value CT detected by the low contrast area detection means 1.

The local contrast enhancement means 3 generates an intermediate image D3 in which the local contrast for each pixel in the input image Din is enhanced according to the enhancement coefficient determined by the enhancement coefficient determination means 2.

The local contrast enhancement means 3 includes, for example, a delay means 31, a nonlinear LPF means 32, a gain determination means 33, and a multiplier 34, as shown in the drawing.

The delay means 31 delays the input image signal Din by a predetermined amount and outputs a delayed image signal D31.

The nonlinear LPF means 32 smoothes the area surrounding each pixel by using values obtained by nonlinear conversion of the values of the surrounding pixels according to the differences between the value of the pixel to be corrected in the input image Din and the values of the surrounding pixels, thereby generating a nonlinearly smoothed signal D32.

The gain determination means 33 uses the enhancement coefficient Ken, the nonlinearly smoothed signal D32, and a signal (delayed image signal) D31 obtained by delaying the input image signal Din to determine a gain G for enhancing the local contrast for each pixel in the input image Din.

The multiplier 34 generates the intermediate image D3 by multiplying each pixel of the delayed image signal by the gain G.

The gain determination means 33 and multiplier 34 constitute a mixing means 35 for mixing the delayed image signal D31 and the nonlinearly smoothed signal D32 in a ratio according to the enhancement coefficient Ken.

The delay means 31, nonlinear LPF means 32, and gain determination means 33 constitute a gain generation means 36 for generating a gain G according to the delayed image signal D31, nonlinearly smoothed signal D32, and enhancement coefficient Ken.

The noise reduction coefficient generation means 4 sets a noise reduction coefficient (NR coefficient) Knr, with which the 3-D noise reduction means 5 performs noise reduction, according to the enhancement coefficient Ken determined by the enhancement coefficient determination means 2.

The 3-D noise reduction means 5 smoothes noise components in the time direction over a plurality of frames of the intermediate image D3, thereby generating an output image Dout with reduced noise.

The 3-D noise reduction means 5 includes, as shown in the drawing, for example, subtractors 51 and 53, a multiplier 52, and a frame memory 54, and constitute a frame recursive noise reduction device.

The elements will now be described in detail.

The input image signal Din is a component signal such as a signal including a luminance signal Y and color difference signals Cb, Cr, or a signal including three primary color signals R, G, B.

In order to detect the low contrast parts of the image, the low contrast area detection means 1 calculates, for each pixel in the input image Din, the contrast correlation value CT of a surrounding area centered on the pixel to be corrected. The contrast correlation value CT indicates the contrast among the pixels included in the surrounding area centered on the pixel to be corrected; that is, it is a quantity correlated with the breadth of the luminance distribution range:

Specifically, a contrast correlation value CT that is small for areas of low local contrast and large for areas of higher local contrast is determined. In other words, as the contrast correlation value for each pixel to be corrected, a value that is small when the contrast of the surrounding area centered on the pixel to be corrected is low and large when the contrast of the surrounding area centered on the pixel to be corrected is high is obtained.

The contrast correlation value CT is calculated, for example, by obtaining the standard deviation of the values of all pixels in a window with a second prescribed size, such as a 5×5 pixel window, centered on each pixel in a window with a first prescribed size centered on the pixel to be corrected, such as an 11×11-pixel window, and averaging the standard deviations over the window with the first prescribed size, that is, the 11×11-pixel window. In more detail, in a window with the first prescribed size, such as an 11×11-pixel window, centered on a pixel to be corrected (the position of which is represented by coordinates (h, v)), for each of the 11×11 pixels in the 11×11-pixel window (the pixels in a rectangular window with four corners at positions indicated by coordinates (h−5, v−5), (h+5, v−5), (h−5, v+5), and (h+5, v+5)), the standard deviation of all the pixels (5×5 pixels) in a window with the second prescribed size, e.g., a 5×5 pixel window (for the pixel at a position indicated by the coordinates (h−5, v−5), for example, a window with four corners positions indicated by coordinates (h−7, v−7), (h−3, v−7), (h−7, v−3), and (h−3, v−3)) is obtained; then the average of these standard deviations obtained for the 11×11 pixels in the window with the first prescribed size (11×11 standard deviations) is obtained, and the average is used as the contrast correlation value CT for the pixel to be corrected.

The contrast correlation value CT may also be obtained by taking the difference (MAX−MIN) between the maximum MAX and minimum MIN of the values of the pixels in the window with the second prescribed size instead of obtaining the standard deviation, and averaging these differences in the window with the first prescribed size.

The window sizes are not limited to 5×5 pixels and 11×11-pixels. The above 'first prescribed size' and 'second prescribed size' may be the same.

The role of the low contrast area detection means 1 is to detect low contrast parts of an image for increasing the degree of contrast enhancement in the low contrast parts through a process described later. Accordingly, if indices other than those described above can be used to detect parts where the contrast should be enhanced, the contrast correlation value CT may be obtained from such other indices. For example, for an image captured under poor weather conditions such as fog or haze, the foggy part not only exhibits a narrowed luminance distribution range but also tends to have few high frequency components, a somewhat bright luminance level, and reduced saturation. Taking advantage of these properties, the luminance level, saturation, and quantity of high frequency components may be detected by means not shown in the drawings and reflected in the contrast correlation value CT.

Specifically, the quantity of high frequency components can be calculated by detecting high frequency components with, e.g., a 3×3-pixel or 5×5-pixel Laplacian filter centered on each pixel in the 11×11-pixel window centered on the pixel to be corrected, taking the absolute value of the filter output, and adding up these values for the pixels in the 11×11-pixel window. In this case, the contrast correlation value CT takes a large value for an area with strong high frequency components and a small value for a flat image.

The luminance level of the surrounding area can be calculated by taking the average luminance value of all the pixels in the 5×5-pixel window centered on the pixel to be corrected. In this case, a luminance level of about ½ to ¾ the brightness of the maximum value of the luminance signal is taken to indicate the presence of fog, and the contrast correlation value CT is given a small value.

When the saturation of the surrounding area is used, if the input image signal Din consists of the luminance signal Y and color difference signals Cb, Cr of the color image, the two color difference signals Cb, Cr can be used to detect the saturation from the following expression (1)

[Expression 1]

$$Srm = \sqrt{Cb^2 + Cr^2} \tag{1}$$

by taking the average value of Srm of all the pixels in the 5×5-pixel window centered on the pixel to be corrected. In this case, the contrast correlation value CT is determined in such a way that it is high for a surrounding area of high saturation and low for a surrounding area of low saturation.

Next, the enhancement coefficient determination means 2 determines a contrast enhancement coefficient Ken for each pixel according to the contrast correlation value CT. In other words, the enhancement coefficient determination means 2 uses the contrast correlation value CT for each pixel to obtain the contrast enhancement coefficient Ken for the pixel. The enhancement coefficient Ken is calculated, for example, from the following expression (2) as a function of the contrast correlation value CT.

[Expression 2]

$$Ken = \begin{cases} \dfrac{K\max}{1 + \left(\dfrac{K\max}{K\min} - 1\right)} & \text{if } 0 \le CT \le CTtp \\ K\min & \text{if } CTtp < CT \end{cases} \quad (2)$$

Here, Kmin, Kmax, and CTtp are preset values; Kmin indicates the minimum value of the enhancement coefficient (Kmin≥1); Kmax indicates the maximum value of the enhancement coefficient (Kmax≥Kmin); CTtp indicates a transition point of the variation in Ken; in the range greater than CTtp, Ken is fixed at Kmin, and in the range equal to or less than CTtp, Ken increases as CT decreases. These parameters may be externally alterable according to the user's image quality settings, or to image scene discrimination results. The relationship between the enhancement coefficient Ken and contrast correlation value CT in expression (2) is as shown in FIG. 2.

Figure 2:
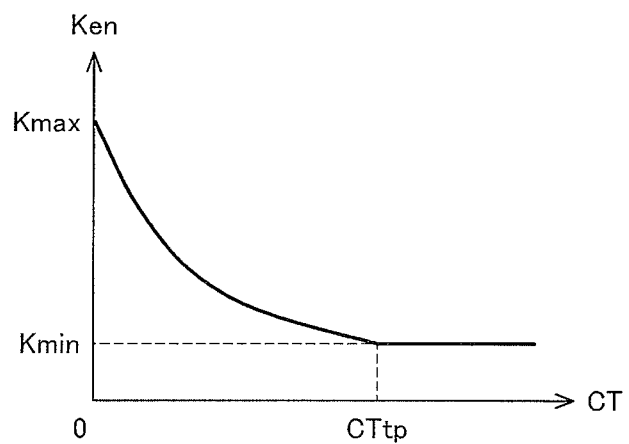
FIG. 2 is a graph showing the relationship of the enhancement coefficient Ken to the contrast correlation value CT in the enhancement coefficient determination means 2 in FIG. 1.

As shown in FIG. 2, the enhancement coefficient Ken has the property of decreasing monotonically as the contrast correlation value CT increases. Specifically, the enhancement coefficient determination means 2 determines the enhancement coefficient Ken in such a way that it is large when the contrast correlation value CT is small and small when the contrast correlation value CT is large. The enhancement coefficient Ken also has the property that its increment increases as the contrast correlation value CT decreases. Provided the enhancement coefficient Ken has these properties, it need not necessarily be calculated from the relationships represented by expression (2) and shown in FIG. 2. Furthermore, although the enhancement coefficient Ken may be obtained by executing the computation in expression (2), the enhancement coefficients Ken corresponding to contrast correlation values CT may also be prestored in the form of a look-up table (LUT). Use of a LUT eliminates the need to perform the computation in expression (2), so that the processing in the enhancement coefficient determination means 2 can be simplified.

The local contrast enhancement means 3 generates an intermediate image D3 in which local contrast has been enhanced for each pixel of the input image Din according to the enhancement coefficient Ken. In other words, on the basis of the enhancement coefficient Ken determined for each pixel (the pixel to be corrected), the local contrast enhancement means 3 generates an intermediate image D3 in which a contrast enhancement has been carried out on the value of the pixel (the pixel to be corrected).

The delay means 31 delays the input image Din by a given amount, equal to the time taken by the low contrast area detection means 1 and nonlinear LPF means 32 to reference the area surrounding the pixel to be corrected.

Figure 3:
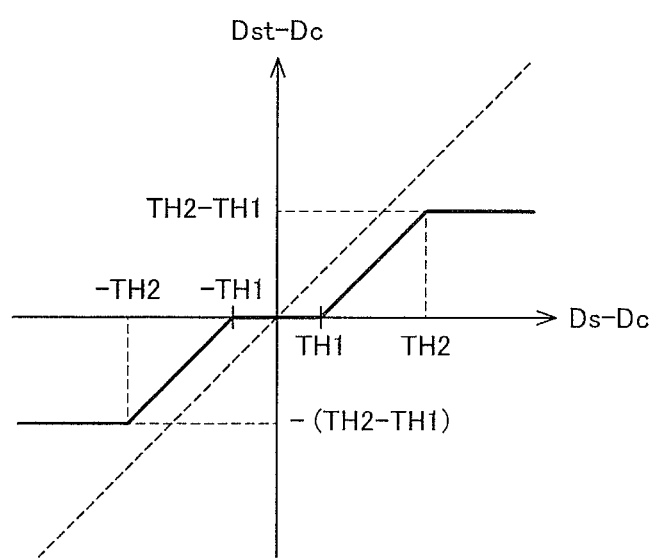
FIG. 3 is a graph showing a nonlinear function for converting surrounding pixel values Ds to corrected pixel values Dst in the nonlinear LPF means 32 in FIG. 1.

The nonlinear LPF means 32 calculates, for example, the average pixel value of the pixels in an 11×11-pixel window centered on a pixel to be corrected. In this calculation, if the value of a surrounding pixel Ds in the window is separated from the value Dc of the pixel to be corrected by no more than a threshold value TH1, that is, if the absolute value of the difference between the value of the surrounding pixel Ds and the value Dc of the pixel to be corrected is equal to or less than the threshold value TH1, then as shown in FIG. 3, the value of the pixel (surrounding pixel) is modified to a pixel value (modified pixel value) Dst whose difference from the value of the pixel to be corrected is 0, and the modified pixel value is used in calculating the average value of the surrounding pixels. If the absolute value of the difference between the value of the surrounding pixel Ds and the value Dc of the pixel to be corrected is equal to or greater than a threshold value TH2, the value of the pixel Ds is modified to a pixel value Dst that differs by (TH2−TH1) from the value Dc of the pixel to be corrected, and the modified pixel value is used in calculating the average value of the surrounding pixels. Furthermore, if the absolute value of the difference between the value of the surrounding pixel Ds and the value Dc of the pixel to be corrected is greater than threshold value TH1 and less than threshold value TH2, the value Ds of the pixel (surrounding pixel) is corrected to a pixel value Dst that differs from the value Dc of the pixel to be corrected by an amount TH1 less than the actual difference, and the modified pixel value is used in calculating the average value of the surrounding pixels.

The above processing is represented by the following expression (3).

[Expression 3]

$$Dst - Dc = \begin{cases} 0 & \text{if } |Ds - Dc| \le TH1 \\ Ds - Dc - TH1 & \text{if } TH1 < Ds - Dc < TH2 \\ Ds - Dc + TH1 & \text{if } -TH1 > Ds - Dc > -TH2 \\ (TH2 - TH1) & \text{if } Ds - Dc \ge TH2 \\ -(TH2 - TH1) & \text{if } Ds - Dc \le TH2 \end{cases} \quad (3)$$

Here, TH1 and TH2 are preset values,

TH1 is a parameter equivalent to a noise clipping threshold value, and

TH2 is a parameter for adjusting the effect of contrast enhancement (TH1≤TH2). These parameters may be externally alterable according to the user's image quality settings, or to image scene discrimination results.

The processing represented by expression (3) can be implemented by taking Ds−Dc as an input, carrying out a coring process with TH1 as the threshold value, and performing a clipping process on the output of the coring process with TH2 as the limit value.

Accordingly, the nonlinear LPF means 32 can be configured by a processing means for carrying out the calculation in expression (3) and obtaining a modified pixel value Dst for each of the 11×11 pixels, a calculation means for taking the average value of the modified pixel values Dst of all the 11×11 pixels, and an adding means for adding the calculated average value to the value Dc of the pixel to be corrected.

For each pixel of the delayed image, the gain determination means 33 uses the nonlinearly smoothed signal D32, the delayed image signal D31, and the enhancement coefficient Ken to determine a gain G for enhancing local contrast, specifically a gain G by which the delayed image signal D31 is to be multiplied by the multiplier 34.

Figure 4:
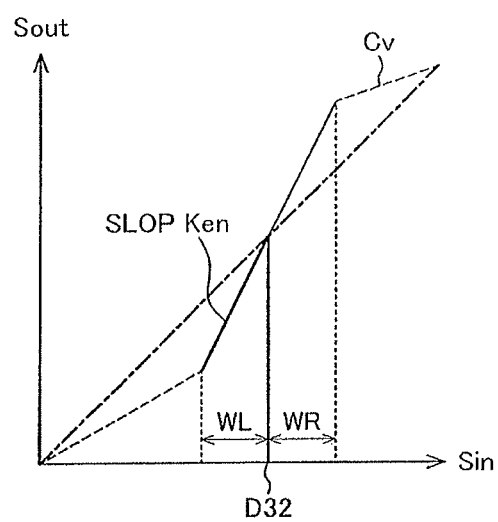
FIG. 4 is a graph showing the relationship between the input signal Sin and output signal Sout of the local contrast enhancement means 3 when the output of the nonlinear LPF means 32 is D32.

How the gain G is calculated will be described with reference to FIG. 4. In FIG. 4 the pixel value D31 input to the multiplier 34 is an input value Sin and the pixel value D3 output from the multiplier 34 is an output value Sout; FIG. 4 is a graph that shows how their relationship is determined according to the value of the nonlinearly smoothed signal D32.

In FIG. 4, the horizontal axis represents the input value Sin, the vertical axis represents the output value Sout, and the polyline Cv depicted by the bold dashed lines and the solid line represents the relationship between the output value Sout and the input value Sin when the value of the nonlinearly smoothed signal D32 is at the position shown on the horizontal axis. The dash-dot line represents Sout=Sin and is accordingly a straight line connecting the origin (Sin=0, Sout=0) and a point at which the input value Sin and output value Sout are both the maximum value Smax (Sin=Smax, Sout=Smax).

The solid line portion of the input-output characteristic indicated by the polyline indicates the input-output characteristic when the input value Sin is located in a range near D32, that is, in the range where D32−WL≤Sin≤D32+WR (where WL and WR have prescribed values, and WL may be equal to WR). This straight line portion has a slope equal to the enhancement coefficient Ken (≥1) and intersects the dash-dot line representing Sout=Sin when Sin=D32. That is, the straight line portion (solid line portion) having a slope equal to the enhancement coefficient Ken shifts so that the horizontal position of the point of intersection varies according to the value of D32.

In the range Sin<D32−WL, the relationship between Sin and Sout is represented by the line (dotted line) connecting the origin (Sin=0, Sout=0) and the point (Sin=D32−WL, Sout=D32−Ken×WL); in the range Sin>D32+WL, the relationship between Sin and Sout is represented by the line (dotted line) connecting (Sin=Smax, Sout=Smax) and the point (Sin=D32+WL, Sout=D32+Ken×WL).

Correction of the pixel values of the input image according to this input-output characteristic can amplify the contrast in an area at a luminance level near the luminance level of the area surrounding the pixel to be corrected by a factor of Ken. Here, if the value input to the multiplier 34 is Sin and the value output from the multiplier 34 is Sout, then in the range of the solid line with slope Ken in the polyline Cv, that is, in the range from D32−WL to D32+WR, Sout can be represented by the following expression (4).

[Expression 4]

$$Sout = Ken \times Sin + (1 - Ken) \times D32 \quad (4)$$

In the range where Sin<D32−WL, the following relationship holds.

[Expression 5]

$$Sout = \frac{D32 - Ken \times WL}{D32 - WL} \times Sin \quad (5)$$

In the range where Sin>D32+WL, the following relationship holds.

[Expression 6]

$$Sout = \frac{Smax - (D32 + Ken \times WR)}{Smax - (D32 - WR)} \times (Sin - Smax) + Smax \quad (6)$$

If the gain G by which the input value Sin is to be multiplied (the gain G to be used for the multiplication when Sin is in the range from D32−WL to D32+WR) is calculated from the relationship in expression (4) with the delayed image signal D31 as the input value Sin, the following expression (7) is obtained.

[Expression 7]

$$G = \frac{Sout}{Sin} = Ken + (1 - Ken) \times \frac{D32}{D31} \quad (7)$$

The gain G when the input value Sin is less than D32−WL and the gain G when the input value Sin is greater than D32+WR are similarly represented by expression (8) and expression (9), respectively.

[Expression 8]

$$G = \frac{Sout}{Sin} = \frac{D32 - Ken \times WL}{D32 - WL} \quad (8)$$

[Expression 9]

$$G = \frac{Sout}{Sin} = \frac{Smax - (D32 + Ken \times WR)}{Smax - (D32 + WR)} \times \left(1 - \frac{Smax}{D31}\right) + \frac{Smax}{D31} \quad (9)$$

The gain determination means 33 uses the nonlinearly smoothed signal D32 and delayed image signal D31 to calculate the gain G from the relationships in expressions (7), (8), and (9).

The multiplier 34 multiplies each pixel of the delayed image signal D31 by the gain G, thereby generating the intermediate image D3. Specifically, D3 is respectively obtained from the following expression (10) when D3−WL≤D31≤D32+WR, from the following expression (11) when D31<D32−WR, and from the following expression (12) when D31>D32+WR.

[Expression 10]

$$D3 = G \times D31 = Ken \times D31 + (1 - Ken) \times D32 \quad (10)$$

[Expression 11]

$$D3 = G \times D31 = \frac{D32 - Ken \times WL}{D32 - WL} \times D31 \quad (11)$$

[Expression 12]

$$D3 = G \times D31 = \left\{\frac{Smax - (D32 + Ken \times WR)}{Smax - (D32 + WR)} \times \left(1 - \frac{Smax}{D31}\right) + \frac{Smax}{D31}\right\} \times D31 \quad (12)$$

In the above, when D31 is in the range from D32−WL to D32+WR, the combination of the gain determination means 33 and multiplier 34 can be regarded as constituting a mixing means 35 for mixing the delayed image signal D31 and nonlinearly smoothed signal D32 in a ratio according to the enhancement coefficient Ken and generating the signal D31 with a value represented by the above expression (10).

As will be understood from expression (7), when Sin is in the range from D32−WL to D32+WR, the gain G output from the gain determination means 33 has a small value when the delayed image signal D31 is smaller than the nonlinearly smoothed signal D32, and has a large value when the delayed image signal D31 is larger than the nonlinearly smoothed signal D32. In short, the gain is calculated in such a way that it is small when the pixel to be corrected exhibits less brightness than the surrounding area and it is large when the pixel to be corrected exhibits greater brightness than the surrounding area. Multiplication by this value enhances the brightness contrast (local contrast) between each pixel and its surrounding area.

Here, the size of the window used when the nonlinear LPF means 32 takes the average value is not limited to 11×11 pixels. When the window is reduced in size, the contrast between each pixel and the brightness of a small surrounding area is enhanced, and a sense of contrast with a higher frequency characteristic (a higher sense of contrast for high-frequency components) is obtained. When the window is enlarged, the contrast between each pixel and the brightness of a larger surrounding range is enhanced, and a sense of contrast with a lower frequency characteristic (a higher sense of contrast for low-frequency components) is obtained. In this way, enhancement effects for specific frequency components can be obtained in the local contrast enhancement means 3, depending on the setting of the window size in the nonlinear LPF means 32.

The noise reduction coefficient generation means 4 sets, for each pixel, the noise reduction coefficient Knr with which the 3-D noise reduction means 5 performs noise reduction, according to the enhancement coefficient Ken. In other words, the noise reduction coefficient generation means 4 sets the noise reduction coefficient Knr for each pixel (pixel to be corrected) on the basis of the enhancement coefficient Ken obtained for that pixel (the pixel to be corrected). The noise reduction coefficient Knr is calculated, for example, from the following expression (13) as a function of the enhancement coefficient Ken.

[Expression 13]

$$Knr = k \cdot \frac{Ken - 1}{Ken + 1} \quad (13)$$

Here, k is a preset value (proportionality constant) in the range satisfying $0 \leq k \leq 1$; k is a parameter for adjusting the degree of noise reduction across the entire image. This parameter may be externally alterable according to the user's image quality settings, or to image scene discrimination results. The relationship between the noise reduction coefficient Knr and enhancement coefficient Ken in expression (13) is as shown in FIG. 5.

Figure 5:
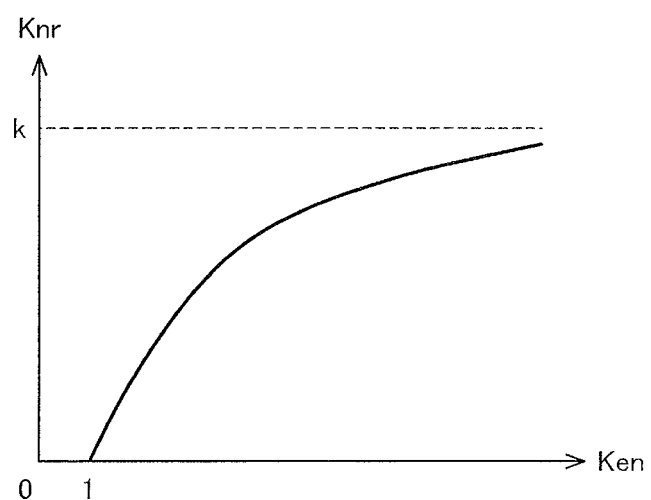
FIG. 5 is a graph showing the relationship of the noise reduction coefficient Knr to the enhancement coefficient Ken in the noise reduction coefficient generation means 4 in FIG. 1.

As shown in FIG. 5, the noise reduction coefficient generation means 4 generates a noise reduction coefficient Knr with the property of increasing monotonically as the enhancement coefficient Ken increases. Specifically, the noise reduction coefficient Knr is so determined that it is small when the enhancement coefficient Ken is small and large when the enhancement coefficient Ken is large. The noise reduction coefficient also has the property that its increment decreases as the enhancement coefficient Ken increases. Provided the noise reduction coefficient Knr has these properties, it need not necessarily be calculated from the relationships represented by expression (13) and shown in FIG. 5. Furthermore, although the noise reduction coefficient Knr may be obtained by executing the computation in expression (13), the noise reduction coefficients Knr corresponding to enhancement coefficients Ken may also be prestored in the form of a look-up table (LUT). Use of a LUT eliminates the need to perform the computation in expression (13), so that the processing in the noise reduction coefficient generation means 4 can be simplified.

The 3-D noise reduction means 5 smoothes noise components in the time direction over a plurality of frames of the intermediate image D3, thereby generating an output image Dout with reduced noise. This processing is performed by use of the noise reduction coefficient set for each pixel. That is, for each pixel (pixel to be corrected) in the intermediate image D3, the 3-D noise reduction means 5 smoothes noise components by using the noise reduction coefficient Knr set for the pixel (the pixel to be corrected), thereby generating an output image Dout with reduced noise.

In a specific exemplary configuration, the 3-D noise reduction means 5 comprises a subtractor 51 for subtracting the output image Dout of the previous frame stored in the frame memory 54 from the intermediate image D3, a multiplier 52 for multiplying the output of the subtractor 51 by the noise reduction coefficient Knr generated in the noise reduction coefficient generation means 4, and a subtractor 53 for subtracting the output of the multiplier 52 from the intermediate image D3. This configuration is that of a known frame recursive noise reduction device, in which the difference between the intermediate image D3 and the output image Dout (the output image from the 3-D noise reduction means 5) for the previous frame is multiplied by the recursion coefficient (=noise reduction coefficient Knr) and the product is subtracted as a noise component from the intermediate image D3, thereby removing the noise component. By iterating the above process on the sequence of input images input once per frame, noise components are smoothed in the time direction over the plurality of frames, and noise can be removed. Varying the recursion coefficient in the range from 0 to 1 determines the proportion of the difference signal that is subtracted as a noise component from the input image.

Figure 6:
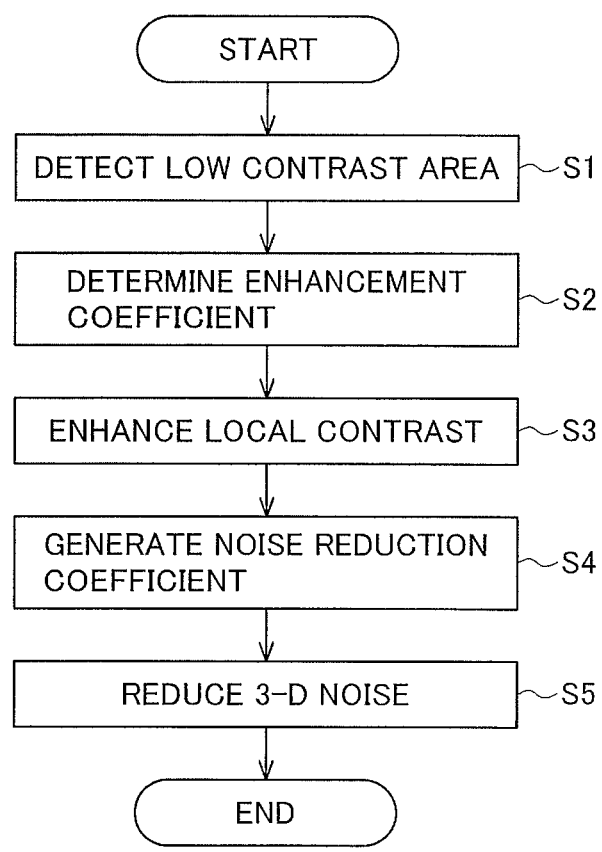
FIG. 6 is a flowchart illustrating the operation of the image processing device according to the first embodiment.

The operation of the image processing device according to the first embodiment of the invention will now be described with reference to FIG. 6. FIG. 6 is a flowchart illustrating the operation of the image processing device according to the first embodiment of the invention. First, the low contrast area detection means 1 calculates the contrast correlation value CT for each pixel of the input image Din (S1). Next, the enhancement coefficient determination means 2 determines the enhancement coefficient Ken for each pixel from the contrast correlation value CT according to the relationship shown in expression (2) and FIG. 2 (S2).

Next, on the basis of the determined enhancement coefficient Ken, the local contrast enhancement means 3 generates an intermediate image D3 in which local contrast has been enhanced for each pixel of the input image Din (S3). Specifically, first, for each pixel of the input image Din, the nonlinear LPF means 32 nonlinearly smoothes the surrounding area by using the values of the surrounding pixels as nonlinearly smoothed according to the relationship shown in FIG. 3. Then, on the basis of the enhancement coefficient Ken, the gain determination means 33 calculates a gain G by using the nonlinearly smoothed signal D32 and delayed image signal D31 according to the relationship shown in expression (5). Finally, the multiplier 34 multiplies each of the pixels of the delayed image signal D31 by the gain G, thereby generating the intermediate image D3.

Next, on the basis of the enhancement coefficient Ken, the noise reduction coefficient generation means 4 generates the noise reduction coefficient Knr from the relationship shown in expression (13) and FIG. 5 (S4).

Next, the 3-D noise reduction means 5 uses the recursion coefficient Knr to smooth noise components in the intermediate image D3 over a plurality of frames, thereby generating an output image Dout with reduced noise (S5). Specifically, first, the subtractor 51 subtracts the output image Dout stored in the frame memory 54 for the previous frame from the intermediate image D3. The subtraction is carried out on mutually identical pixels in both images. Then, the multiplier 52 multiplies each pixel of the output from the subtractor 51 by the noise reduction coefficient Knr. Next, the subtractor 53 subtracts the output of the multiplier 52 from the intermediate image D3 to generate the output image Dout. Finally, the output image Dout is stored in the frame memory 54, and the process proceeds to the next frame.

The above is a description of the operation of the image processing device according to the first embodiment of the invention.

Figure 7A:
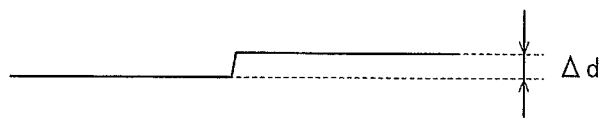
FIGS. 7(a) to 7(d) are exemplary signals appearing at different points in the image processing device according to the first embodiment.
Figure 7B:
Figure 7C:
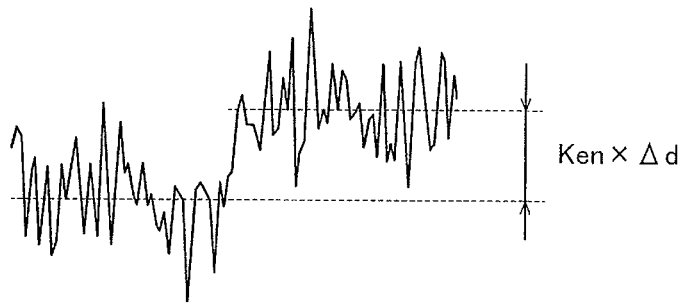
Figure 7D:
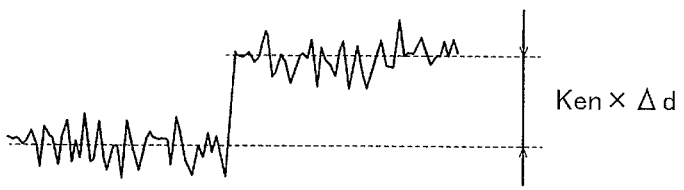

The effects of the image processing device according to the first embodiment of the invention will be described with reference to FIGS. 7(a) to 7(d). FIGS. 7(a) to 7(d) one-dimensionally represent the edge of a subject in an image and the image signal corresponding to the edge; the horizontal axis represents pixel position and the vertical axis represents signal level. FIG. 7(a) represents the edge of the subject without noise; FIG. 7(b) represents the edge in the input image Din (with noise present); FIG. 7(c) represents the edge in the intermediate image D3 (with enhanced local contrast); FIG. 7(d) represents the edge of the output image Dout (with reduced noise).

FIG. 7(a), which represents the edge of the subject without noise, shows a case in which the amplitude Δd of the edge signal is extremely small, as in, for example, a mountain ridge line in the background of a foggy image. When this type of subject is imaged by a camera, random noise is superimposed on the actual signal level variations as shown in FIG. 7(b). The amplitude of the random noise is assumed here to be substantially the same as the amplitude Δd of the edge signal.

FIG. 7(c) represents the edge in the result (intermediate image D3) of contrast enhancement of the area surrounding the edge with the enhancement coefficient Ken. As mentioned above, the local contrast enhancement means 3 has the input-output characteristic shown in FIG. 4, so that if the nonlinearity in the nonlinear LPF means 32 is ignored, it has the effect of amplifying the contrast components in the input image, centered on the average signal level (D32) of the surrounding area, by a factor equal to the enhancement coefficient Ken. Accordingly, if the amplitude of the edge in the input image Din is Δd, the amplitude of the edge with enhanced local contrast is Ken×Δd. If the noise clipping threshold value (TH1) in the nonlinear LPF means 32 is 0 here, then the noise amplitude is also amplified by Ken, and noise components that were below the limit of perception in the input image state (FIG. 7(a)) are now above the limit of perception, becoming obtrusive noise that is visually perceived. By setting the clipping noise threshold value (TH1) in the nonlinear LPF means 32 at a value greater than 0, noise components with an amplitude equal to or less than TH1 can be clipped; given the input image shown in FIG. 7(b), however, in order to suppress the noise completely, TH1 must be set to a value substantially equal to Δd, and in that case, even the edge signal would be clipped, making it impossible to enhance the contrast of the signal component.

The first embodiment therefore provides a 3-D noise reduction means 5 for smoothing noise components in the time direction over a plurality of frames in the intermediate image D3 in which local contrast has been enhanced, whereby, as shown in FIG. 7(d), random noise components alone can be reduced without attenuating the amplitude of the signal representing the enhanced subject (edge).

The local contrast enhancement means 3 has the effect of accentuating edges in parts with contrast lowered by enhancement of the contrast of specific frequency components (high frequency components in particular). Noise reduction systems that eliminate high frequency components by using only one image frame, as in the imaging device described in Patent Document 3, have been known to affect high frequency components enhanced by local contrast enhancement, thereby canceling out the enhancement effect and causing edge blur etc., resulting in lowered visibility. The problem has been that in a foggy or hazy image, although a defogging or dehazing effect is produced by using local contrast enhancement to accentuate the edges of subjects disposed in fog or haze, since the edges are blurred by noise reduction, the image again appears hazy.

To reduce noise amplified by local contrast enhancement, the first embodiment of the invention provides a 3-D noise reduction means 5 for smoothing noise components in the time direction over a plurality of frames, so that it can effectively reduce noise alone, without affecting the frequency components of one image frame, that is, without causing blurring of edges enhanced by local contrast enhancement. This enables fog or haze to be eliminated from a foggy or hazy image by local contrast enhancement, and the accompanying noise to be effectively reduced.

Next, the effect produced by determining the enhancement coefficient Ken for each pixel from the contrast correlation value CT according to the relationship shown in expression (2) and FIG. 2 in the enhancement coefficient determination means 2 will be described.

In the image processing device according to the first embodiment, the low contrast area detection means 1 detects, for each pixel in the input image Din, the contrast correlation value CT of a surrounding area centered on the pixel to be corrected. The contrast correlation value CT is obtained, for example, by averaging the standard deviations of the pixel values in small image areas over the surrounding area. Accordingly, if an area has a small contrast correlation value CT it means that the luminance distribution range is narrow in the surrounding area, and if an area has a large contrast correlation value CT it means that the luminance distribution range is wide in the surrounding area. That is, assuming a foggy or hazy image, it can be said that an area with a small contrast correlation value CT is an area in which contrast is greatly lowered by fog or haze, and an area with a large contrast correlation value CT is an area in which the lowering of contrast by fog or haze is slight. Accordingly, in the enhancement coefficient determination means 2, as shown in expression (2) and FIG. 2, the enhancement coefficient Ken is determined in such a way that it is large when the contrast correlation value CT is small and small when the contrast correlation value CT is large, whereby the amount of amplification of contrast components in the local contrast enhancement means 3 can be increased.

Because of the property that the increment of the enhancement coefficient Ken increases as the contrast correlation value CT decreases, the enhancement coefficient Ken for an area in which the only contrast is at an invisible level (an area with a contrast correlation value CT near 0) can be further increased, as compared with an area originally having a visible contrast level, whereby the visibility of parts with lowered contrast can be improved appropriately.

The calculation of the enhancement coefficient Ken in the enhancement coefficient determination means 2 need not necessarily be carried out according to the relationships shown in expression (2) and FIG. 2. The enhancement coefficient Ken need only be determined according to the property of decreasing monotonically with respect to the contrast correlation value CT. That is, it suffices to determine the enhancement coefficient Ken in such a way that it is large when the contrast correlation value CT is small and small when the contrast correlation value CT is large. The enhancement coefficient Ken preferably also has the property that its increment increases as the contrast correlation value CT decreases. Provided the above properties are satisfied, the effect of appropriate improvement of visibility in parts with lowered contrast will be produced, just as when the relationships shown in expression (2) and FIG. 2 are used.

Next, the effect of generating the noise reduction coefficient Knr in the noise reduction coefficient generation means 4 on the basis of the enhancement coefficient Ken, according to the relationships shown in expression (13) and FIG. 5, will be described.

As mentioned above, the local contrast enhancement means 3 has the effect of amplifying contrast components of the input image centered on the average level (D32) of the surrounding area by the enhancement coefficient Ken. Accordingly, if the case in which the input image is a flat image with superimposed noise is considered, the signal level remains unchanged and only the noise components are amplified by a factor of Ken. That is, when the enhancement coefficient is Ken, the SNR (Signal-Noise Ratio) is degraded by 10 log(Ken) dB. In the 3-D noise reduction means 5, if the noise reduction coefficient (recursion coefficient) is Knr, the amount of improvement in the SNR (in dB) is represented by the following expression (14).

[Expression 14]

$$SNR \text{ improvement} = 10\log\frac{1+Knr}{1-Knr} \quad (14)$$

In the 3-D noise reduction means 5, it would be desirable if noise could be reduced by the amount by which it was amplified in the local contrast enhancement means 3. Thus, if the amount by which the SNR is degraded by the local contrast enhancement means 3 equals the amount by which the SNR is improved by the 3-D noise reduction means 5, the relationship in the following expression (15) is derived.

[Expression 15]

$$Knr = \frac{Ken-1}{Ken+1} \quad (15)$$

Accordingly, when k=1 in expression (13), the noise reduction coefficient generation means 4 generates the noise reduction coefficient Knr according to the relationship shown in expression (15), thereby enabling the 3-D noise reduction means 5 to improve the SNR by just the amount by which the SNR was degraded in the local contrast enhancement means 3. It is thereby possible to amplify only the contrast of the signal component by the enhancement coefficient Ken, leaving random noise components at almost the same level as in the input image. Furthermore, since the degree of enhancement in the local contrast enhancement means 3 varies for each pixel according to the enhancement coefficient Ken, there is the possibility that noise might be unevenly perceived in the image, but the 3-D noise reduction means 5 can adjust the amount of SNR improvement on a pixel by pixel basis, so that the perceived noise level in the image frame can be uniformized. As described above, by generating the noise reduction coefficient Knr on the basis of the enhancement coefficient Ken and from the relationship shown in expression (13) and FIG. 5 in the noise reduction coefficient generation means 4, noise can be reduced appropriately according to the degree of amplification of noise associated with local contrast enhancement.

The 3-D noise reduction means 5 reduces noise by smoothing noise components in the time direction over a plurality of frames of the input image, so that there is the disadvantage that with respect to a subject in motion, as the noise reduction coefficient Knr increases, motion components are also smoothed in the time direction, generating ghosts. According to the first embodiment of the invention, the local contrast enhancement means 3 sets the noise reduction coefficient Knr to a small value in parts where the enhancement coefficient Ken is small and noise is not amplified by the local contrast enhancement means 3, so that unnecessary ghosting can be prevented. By setting the value of k in expression (13) at a value less than 1, the noise reduction effect for the entire image can be adjusted to reduce ghosts.

Furthermore, a detection means (not shown) for detecting subject motion on a pixel by pixel basis in the input image and a coefficient generation means (not shown) for generating a coefficient k taking a small value for pixels in motion and a large value for pixels that are not in motion may be newly added to configure a motion adaptive 3-D noise reduction means. In this case, the occurrence of ghosts in parts where motion is present can be reduced by adopting a configuration in which the k in expression (13) varies for each pixel and is determined according to the result of motion detection for each pixel.

The calculation of the noise reduction coefficient Knr in the noise reduction coefficient generation means 4 need not necessarily be carried out according to the relationships represented by expression (13) and in FIG. 5. The noise reduction coefficient Knr need only be generated according to the property of increasing monotonically with respect to the enhancement coefficient Ken. That is, it suffices to determine the noise reduction coefficient Knr in such a way that it is small when the enhancement coefficient Ken is small and large when the enhancement coefficient Ken is large. The noise reduction coefficient Knr preferably also has the property that its increment decreases as the enhancement coefficient Ken increases. This is because the amount of SNR improvement represented by expression (14) rapidly increases as Knr increases. Provided the above properties are satisfied, the effect of appropriate reduction in noise according to the degree of noise amplification associated with local contrast enhancement will be produced, just as when the relationships shown in expression (13) and FIG. 5 are used.

The configuration of the 3-D noise reduction means 5 need not necessarily be of the frame recursive type. It need only be a configuration that smoothes noise components in the time direction over a plurality of frames in the input image and is capable of control of the degree of smoothing by the noise reduction coefficient Knr. For example, it may be a 3-D noise reduction means that has a frame memory for a plurality of frames and reduces noise by averaging in the time direction, and a frame adding means (not shown) that controls the number of frames added for each pixel according to the noise reduction coefficient Ken may be provided. This configuration can produce the same effects.

Second Embodiment

Figure 8:
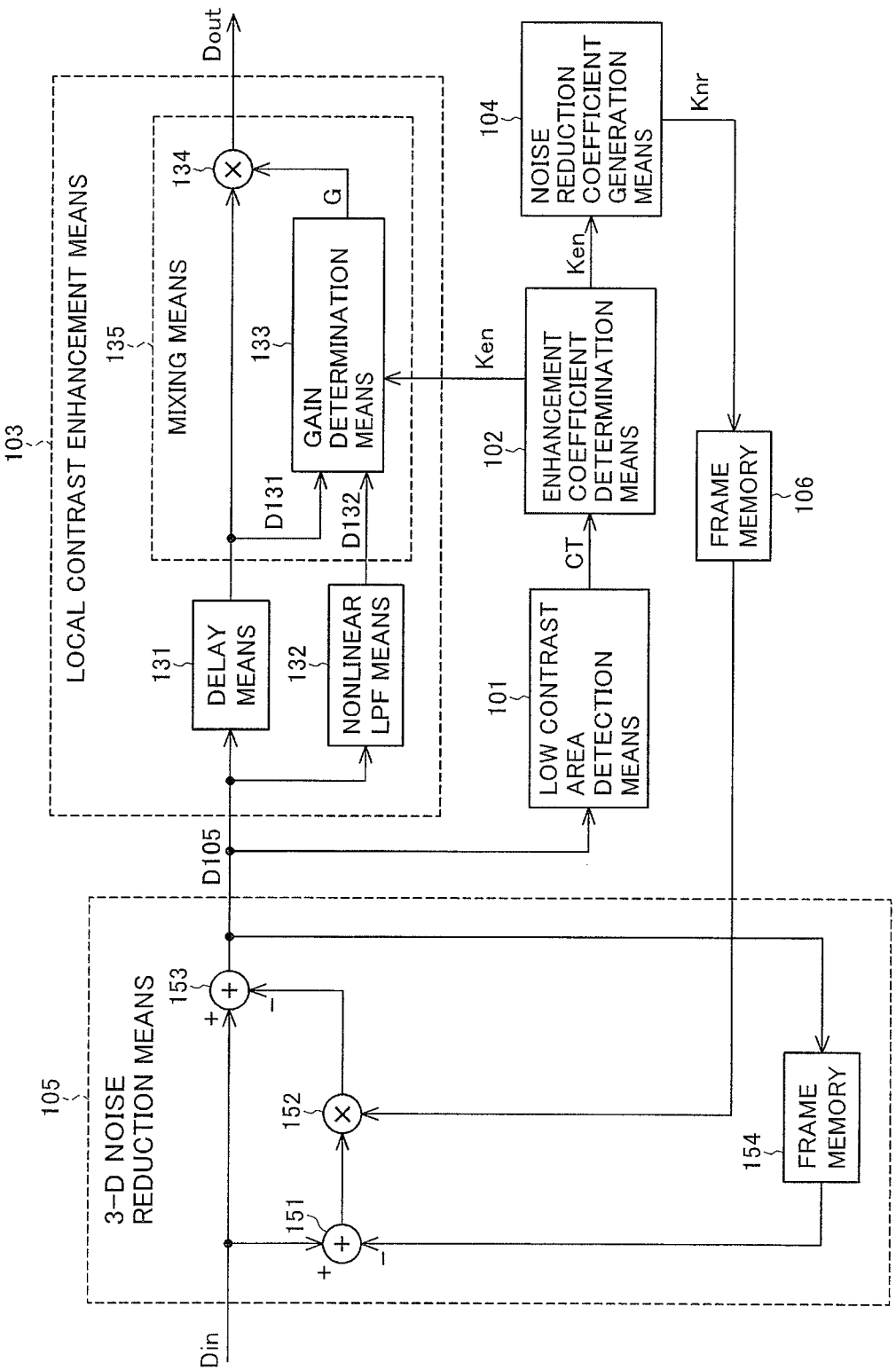
FIG. 8 is a block diagram showing the configuration of the image processing device according to a second embodiment of the invention.

FIG. 8 is a block diagram showing the configuration of the image processing device according to the second embodiment of the invention. Differing from the first embodiment, the image processing device according to the second embodiment has a configuration in which the 3-D noise reduction means is located in a stage preceding the low contrast area detection means and local contrast enhancement means.

The image processing device according to the second embodiment includes a 3-D noise reduction means 105, a low contrast area detection means 101, an enhancement coefficient determination means 102, a local contrast enhancement means 103, a noise reduction coefficient generation means 104, and a frame memory 106.

The 3-D noise reduction means 105 has the same configuration as the 3-D noise reduction means 5 in the first embodiment, but receives the input image Din instead of the intermediate image D3 as its input, and smoothes noise components in the time direction over a plurality of frames of the input image Din, thereby generating an intermediate image D105 with reduced noise.

The intermediate image D105 must have adequate bit precision to prevent the occurrence of tone jump by the local contrast enhancement means 103 in the following stage.

The low contrast area detection means 101 has the same configuration as the low contrast area detection means 1 in the first embodiment, but receives the intermediate image D105 instead of the input image Din, and detects the contrast correlation value CT of a surrounding area centered on the pixel to be corrected for each pixel in the intermediate image D105.

The enhancement coefficient determination means 102 has the same configuration as the enhancement coefficient determination means 2 in the first embodiment and determines the contrast enhancement coefficient Ken for each pixel according to the contrast correlation value CT detected by the enhancement coefficient determination means 102.

The local contrast enhancement means 103 has the same configuration as the local contrast enhancement means 3 in the first embodiment, but receives the intermediate image D105 instead of the input image Din as an input, and generates an output image Dout with local contrast enhanced for each pixel in the intermediate image D105 according to the enhancement coefficient Ken determined by the enhancement coefficient determination means 102.

The noise reduction coefficient generation means 104 has the same configuration as the noise reduction coefficient generation means 4 in the first embodiment, and sets the noise reduction coefficient Knr with which the 3-D noise reduction means 105 reduces noise according to the enhancement coefficient Ken determined by the enhancement coefficient determination means 102.

The internal configurations of the above means are the same as in the first embodiment, so that detailed descriptions will be omitted.

The frame memory 106 stores the noise reduction coefficients Knr generated by the noise reduction coefficient generation means 104 for the individual pixels in one frame.

The noise reduction coefficients Knr stored in the frame memory 106 are used in the processing of each of the pixels in the next frame by the 3-D noise reduction means 105.

Figure 9:
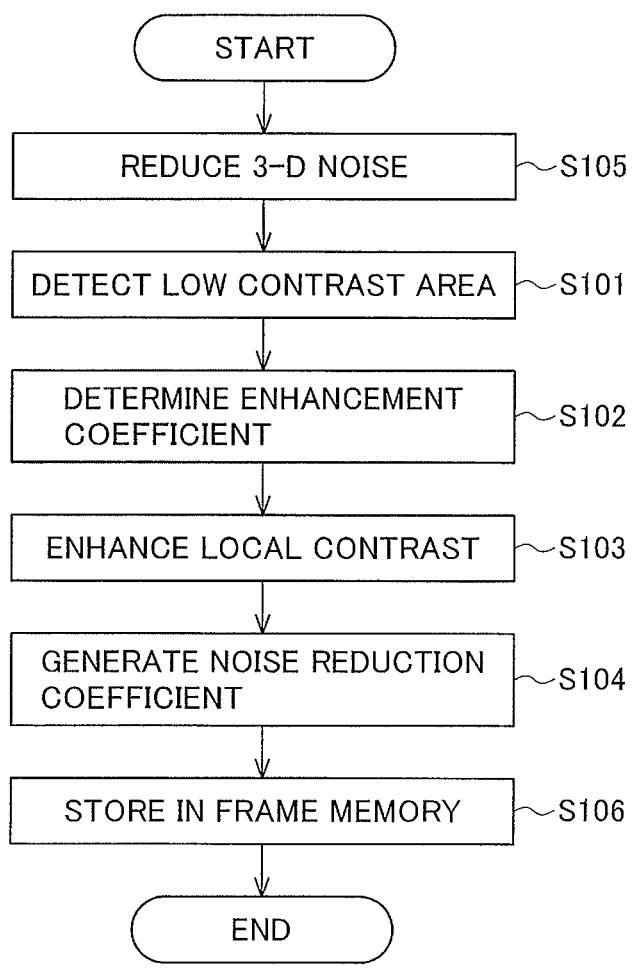
FIG. 9 is a flowchart illustrating the operation of the image processing device according to the second embodiment.

The operation of the image processing device according to the second embodiment of the invention will now be described with reference to FIG. 9. FIG. 9 is a flowchart illustrating the operation of the image processing device in the second embodiment of the invention. The operation according to the second embodiment differs from the first embodiment in that first the 3-D noise reduction means 105 reduces noise in the input image Din.

First, the 3-D noise reduction means 105 smoothes noise components over a plurality of frames of the input image Din with a recursion coefficient Knr, thereby generating an intermediate image D105 with reduced noise (S105).

Next, the low contrast area detection means 101 calculates a contrast correlation value CT for each pixel in the intermediate image D105 (S101).

Next, the enhancement coefficient determination means 102 uses the contrast correlation value CT (S102) to determine an enhancement coefficient Ken for each pixel from the relationship represented in expression (2) and FIG. 2.

Next, on the basis of the determined enhancement coefficient Ken, the local contrast enhancement means 103 generates an output image Dout in which local contrast is enhanced for each pixel in the intermediate image D105 (S103).

On the basis of the enhancement coefficients Ken, the noise reduction coefficient generation means 104 then generates noise reduction coefficients Knr from the relationship represented in expression (13) and FIG. 5 (S104).

Finally, the noise reduction coefficients Knr are stored in the frame memory 106, and the process proceeds to the processing of the next frame.

The details of the operation in each step are the same as in the first embodiment, so that descriptions will be omitted.

The noise reduction coefficients are generated in step S104 after the enhancement coefficients Ken are determined in step S102, so that in step S105, the noise reduction coefficients Knr for the previous frame, which are read from the frame memory 106, are used to perform 3-D noise reduction. Accordingly, after the noise reduction coefficients Knr are generated in step S104, the noise reduction coefficients Knr for each pixel in the current frame are stored in the frame memory 106 in step S106.

The effects of the image processing device according to the second embodiment of the invention will now be described with reference to FIGS. 10(*a*) to 10(*e*). Like FIGS. 7(*a*) to 7(*d*), FIGS. 10(*a*) to 10(*e*) one-dimensionally represent the edge of a subject in an image and the image signal corresponding to the edge; the horizontal axis represents pixel position and the vertical axis represents signal level. FIG. 10(*a*) represents the edge of the subject without noise; FIG. 10(*b*) represents the edge (with noise present) in the input image Din; FIG. 10(*c*) represents the edge (with reduced noise) in the intermediate image D105; FIG. 10(*d*) and FIG. 10(*e*) represent the edge (with enhanced local contrast) in the output image Dout.

As in FIGS. 7(*a*) to 7(*d*), the edge signal has amplitude $\Delta d$, and an input image Din, shown in FIG. 10(*b*), having substantially the same degree of random noise as the amplitude $\Delta d$ of the edge signal is assumed. FIG. 10(*c*) represents the edge in the intermediate image D105 after noise in the input image Din is reduced by the 3-D noise reduction means 105. Since the noise component is smoothed in the time direction over a plurality of frames of the input image Din, the random noise component can be reduced alone without attenuation of the amplitude of the subject signal (edge).

Next, FIGS. 10(*d*) and 10(*e*) represent the edge in the output image Dout resulting from contrast enhancement of the intermediate image D105 as performed with the enhancement coefficient Ken by the local contrast enhancement means 103. FIG. 10(*d*) represents the case in which the noise clipping threshold value (TH1) in the nonlinear LPF means 132 is 0, and FIG. 10(*e*) represents a case in which the noise clipping threshold value (TH1) in the nonlinear LPF means 132 is greater than 0 and less than $\Delta d$.

When the noise clipping threshold value (TH1) in the nonlinear LPF means 132 is 0, as mentioned above, the local contrast enhancement means 103 can be approximated as a process of amplifying the contrast components in the input image, centered on the average signal level (D32) of the surrounding area, by a factor equal to the enhancement coefficient Ken, so that the amplitude of the edge is Ken×$\Delta d$, which increases its visibility. Here, the noise components are also amplified by a factor of Ken, but local contrast enhancement is performed on the image (FIG. 10(c)) in which the noise amplified according to the enhancement coefficient Ken has already been reduced from its level in the input image Din (FIG. 10(b)), so that the noise in the output image Dout (FIG. 10(d)) can be suppressed to the level in the input image Din.

Figure 10A:
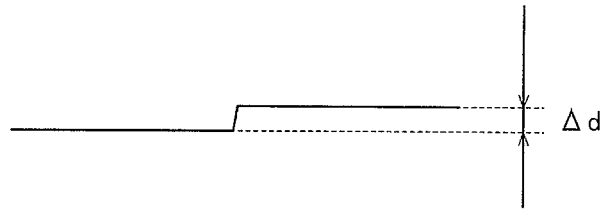
FIGS. 10(a) to 10(e) are exemplary signals appearing at different points in the image processing device according to the second embodiment.
Figure 10B:
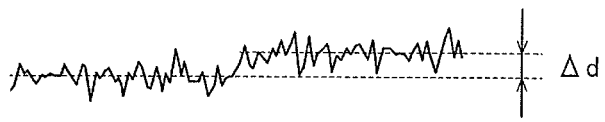
Figure 10C:
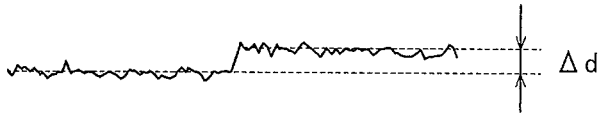
Figure 10D:
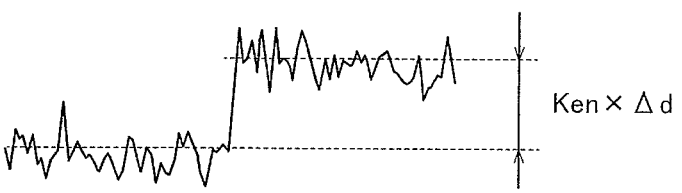
Figure 10E:
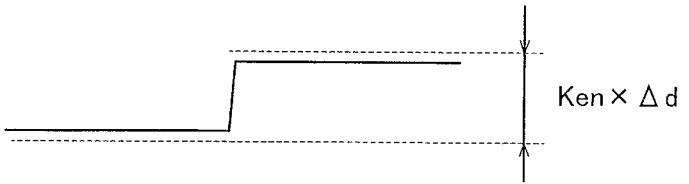

Performing noise reduction on the input image Din (FIG. 10(b)) in advance causes a difference between the amplitude of the edge signal and the amplitude of the noise component in the intermediate image D105 (FIG. 10(c)). In the state in FIG. 10(b), the edge signal amplitude and noise amplitude are substantially the same, so that an appropriate noise clipping threshold value (TH1) cannot be set in the nonlinear LPF means 132. In the state in FIG. 10(c), however, by setting the noise clipping threshold value (TH1) at a value greater than 0 and less than Δd, the edge signal and noise components can be separated from each other, and the local contrast enhancement means 103 can amplify only the contrast of the edge signal while suppressing noise (FIG. 10(e)).

Accordingly, the image processing device according to the second embodiment produces not only the same effects as the first embodiment, but also the additional effect that, as described above, subject signals and noise signals are separated by noise reduction and faint subject signals that conventionally could not be enhanced because they blended into the noise are highlighted by contrast enhancement. Since the intermediate image D105 with reduced noise is also input to the low contrast area detection means 101, a further effect is produced: the enhancement coefficients Ken and noise reduction coefficients Knr are less likely to be affected by noise in the input image Din.

Third Embodiment

Figure 11:
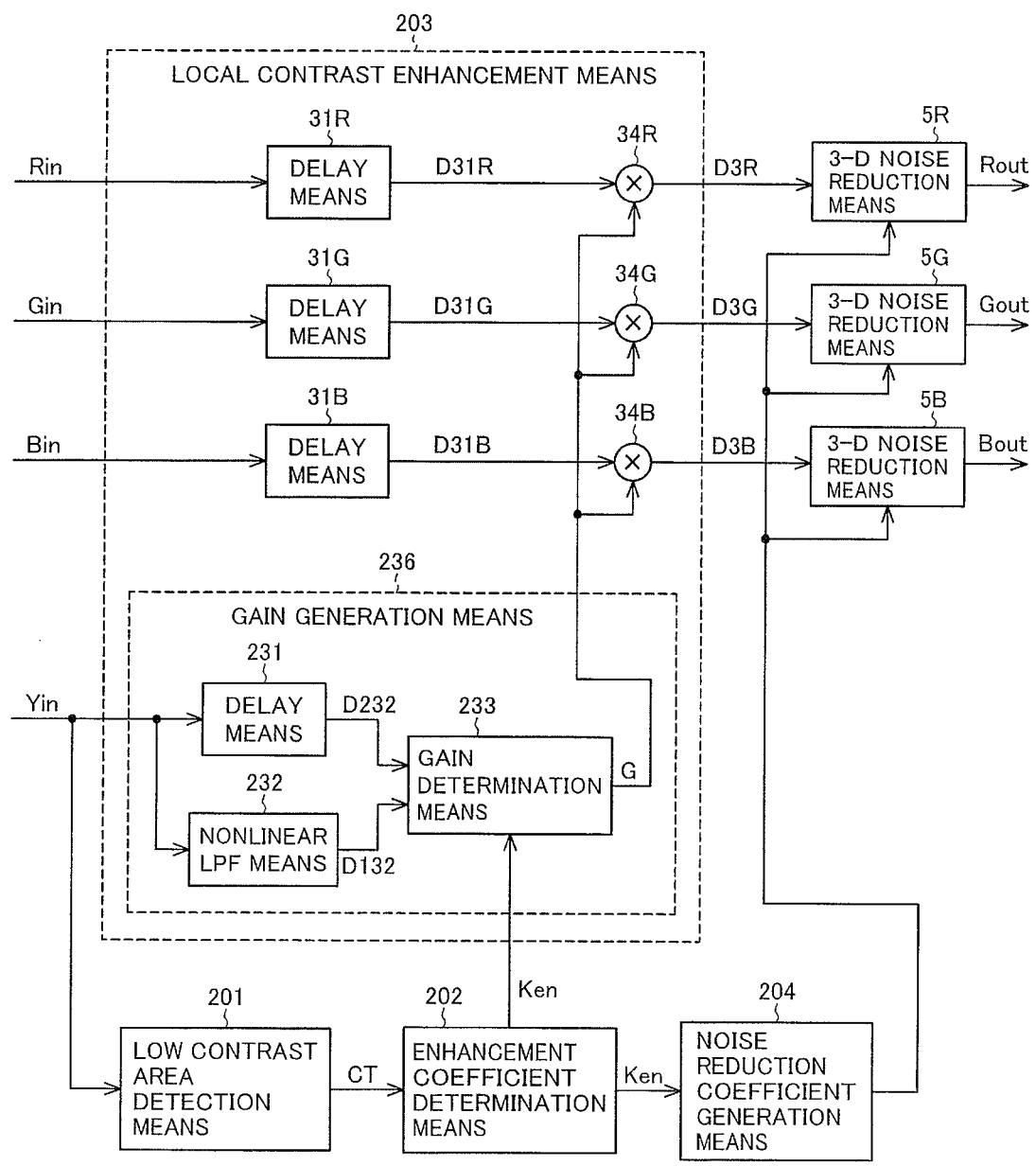
FIG. 11 is a block diagram showing the configuration of the image processing device according to a third embodiment of the invention.

FIG. 11 is a block diagram showing the configuration of the image processing device according to the third embodiment of the invention. Differing from the first embodiment, the image processing device according the third embodiment performs detection of low contrast parts and determination of the enhancement coefficient Ken, gain G, and noise reduction coefficient Knr on the basis of a luminance signal Yin (a first image signal) representing a luminance component of the image, and performs local contrast enhancement with the determined gain G and noise reduction with the determined noise reduction coefficient Knr on the color image signal Rin, Gih, Bin (a second image signal) of each of the red (R), green (G), and blue (B) color components in the same image.

The image processing device in FIG. 11 includes a low contrast area detection means 201, an enhancement coefficient determination means 202, a local contrast enhancement means 203, a noise reduction coefficient generation means 204, and 3-D noise reduction means 5R, 5G, 5B.

The low contrast area detection means 201 has the same configuration as the low contrast area detection means 1 in FIG. 1, but receives a luminance image Yin as the input image Din and detects the contrast correlation value CT of a surrounding area centered on the pixel to be corrected for each pixel in the luminance image Yin.

The enhancement coefficient determination means 202 determines the contrast enhancement coefficient Ken for each pixel according to the contrast correlation value CT detected by the low contrast area detection means 201.

The local contrast enhancement means 203 generates intermediate images D3R, D3G, D3B in which local contrast is enhanced for each pixel in the red, green, and blue input images Rin, Gin, and Bin according to the enhancement coefficients Ken determined by the enhancement coefficient determination means 202.

The local contrast enhancement means 203 includes a delay means 231, a nonlinear LPF means 232, and a gain determination means 233.

These means have the same configurations as the delay means 31, nonlinear LPF means 32, and gain determination means 33 shown in FIG. 1, and carry out the same processing as described in the first embodiment on the luminance image Yin input as the input image Din.

The delay means 231, nonlinear LPF means 232, and gain determination means 233 constitute a gain generation means 236 for generating a gain on the basis of the luminance image Yin.

The local contrast enhancement means 203 further includes delay means 31R, 31G, 31B.

The delay means 31R, 31G, 31B have the same configuration as the delay means 231, but respectively receive red, green, and blue input images Rin, Gin, Bin, and output signals (delayed image signals) D31R, D31G, D31B, which are delayed by the same delay time as in delay means 231.

The multipliers 34R, 34G, 34B multiply the delayed image signals D31R, D31G, D31B from the delay means 31R, 31G, 31B by the gain G for each pixel, thereby generating intermediate images D3R, D3G, D3B.

According to the enhancement coefficient Ken determined by the enhancement coefficient determination means 202, the noise reduction coefficient generation means 204 sets the noise reduction coefficient (NR coefficient) Knr with which the 3-D noise reduction means 5R, 5G, 5B perform noise reduction.

The 3-D noise reduction means 5R, 5G, 5B individually have the same configuration as the 3-D noise reduction means 5 in FIG. 1, but instead of the intermediate image D3, they respectively receive red, green, and blue intermediate images D3R, D3G, D3B as input, and process these images.

Specifically, the 3-D noise reduction means 5R smoothes noise components in the time direction over a plurality of frames of the red intermediate image D3R, thereby generating a red output image Rout with reduced noise.

The 3-D noise reduction means 5G smoothes noise components in the time direction over a plurality of frames of the green intermediate image D3G, thereby generating a green output image Gout with reduced noise.

The 3-D noise reduction means 5B smoothes noise components in the time direction over a plurality of frames of the blue intermediate image D3B, thereby generating a blue output image Bout with reduced noise.

As described above, according to the third embodiment, the same effects as in the first embodiment are obtained, and since contrast enhancement and noise reduction are performed on all of the color images using the gain G and noise reduction coefficients Knr determined on the basis of the luminance image, it is also possible to improve the image without impairing its color balance.

Fourth Embodiment

Figure 12:
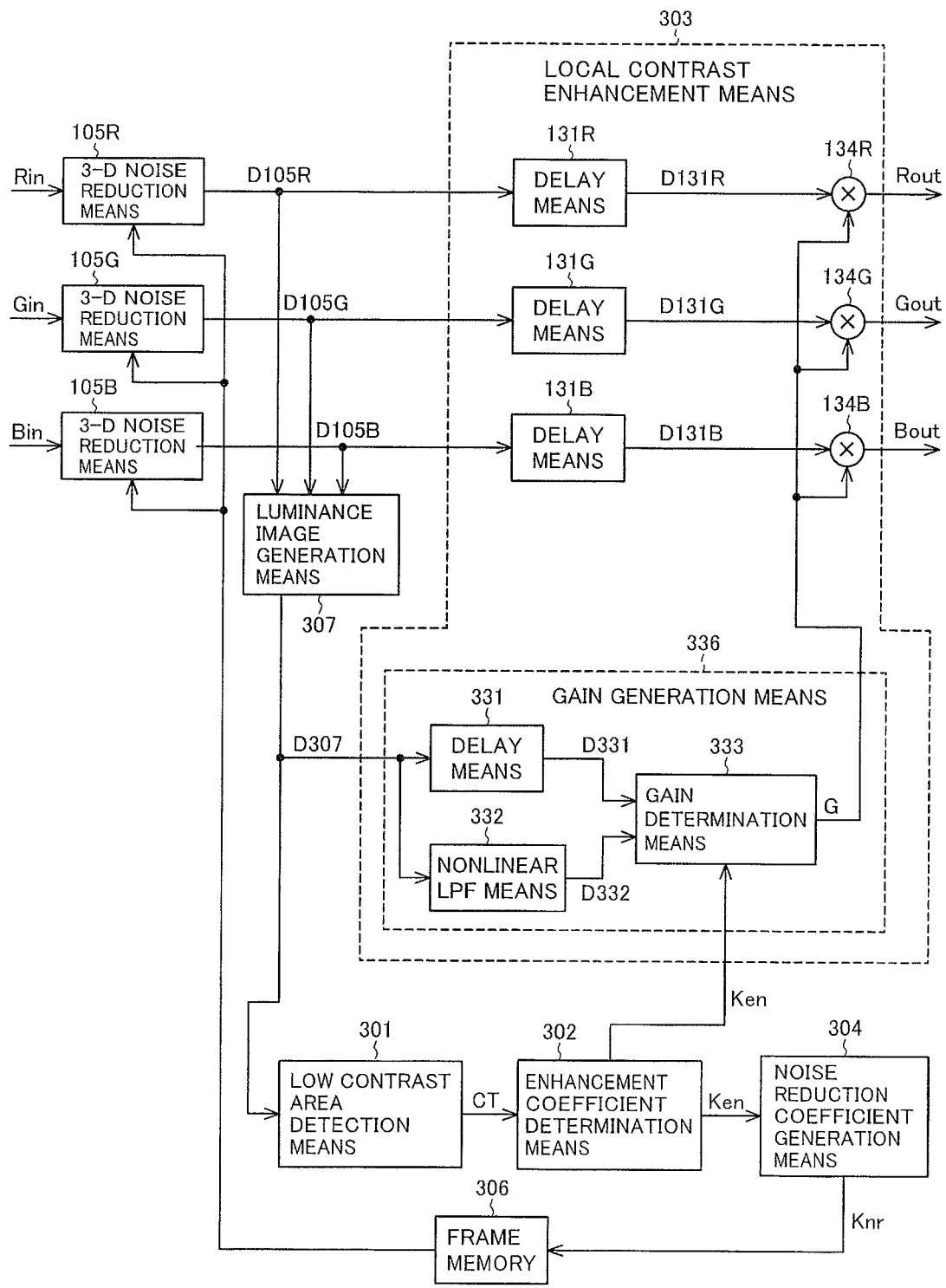
FIG. 12 is a block diagram showing the configuration of the image processing device according to a fourth embodiment of the invention.

FIG. 12 is a block diagram showing the configuration of the image processing device according to the fourth embodiment. As in the third embodiment, the image processing device according to the fourth embodiment detects low contrast areas and determines the enhancement coefficients Ken, gain G, and noise reduction coefficients Knr on the basis of a luminance image, and performs local contrast enhancement using the determined gain G and noise reduction using the noise reduction coefficients Knr on red (R), green (G), blue (B) color images. As in the second embodiment, the image processing device in the fourth embodiment places the 3-D noise reduction means in the stage preceding the low contrast area detection means and local contrast enhancement means.

The image processing device in FIG. 12 includes 3-D noise reduction means 105R, 105G, 105B, a low contrast area detection means 301, an enhancement coefficient determination means 302, a local contrast enhancement means 303, a noise reduction coefficient generation means 304, a frame memory 306, and a luminance image generation means 307.

The 3-D noise reduction means 105R, 105G, 105B, each have the same configuration as the 3-D noise reduction means 105 in FIG. 8, but respectively receive red, green, and blue input images Rin, Gin, and Bin, and process these images.

Specifically, the 3-D noise reduction means 105R smoothes noise components in the time direction over a plurality of frames of the red input image Rin, thereby generating a red intermediate image D105R with reduced noise.

The 3-D noise reduction means 105G smoothes noise components in the time direction over a plurality of frames of the green input image Gin, thereby generating a green intermediate image D105G with reduced noise.

The 3-D noise reduction means 105B smoothes noise components in the time direction over a plurality of frames of the blue input image Bin, thereby generating a blue intermediate image D105B with reduced noise.

The luminance image generation means 307 receives the intermediate images D105R, D105G, D105B as input, and generates an intermediate luminance image D307 by, for example, the operation expressed by $$D307 = \alpha \times D105R + \beta \times D105G + \gamma \times D105B$$

where $\alpha+\beta+\gamma=1$: for example,
$\alpha=1/4, \beta=1/2, \gamma=1/4$ are used. Alternatively, for more accurate calculation,
$\alpha=0.299, \beta=0.587, \gamma=0.114$ may be used.

The low contrast area detection means 301 has the same configuration as the low contrast area detection means 101 in FIG. 8, but receives the luminance image D307 instead of the intermediate image D105 and detects the contrast correlation value CT of a surrounding area centered on the pixel to be corrected for each pixel in the luminance image D307.

The enhancement coefficient determination means 302 determines the contrast enhancement coefficient Ken for each pixel according to the contrast correlation value CT detected by the low contrast area detection means 301.

The local contrast enhancement means 303 has the same configuration as the local contrast enhancement means 203 in FIG. 11, but instead of the input images Rin, Gin, Bin, it receives color intermediate images D105R, D105G, D105B, and generates output images Rout, Gout, Bout in which local contrast is enhanced for each pixel in the intermediate images D105R, D105G, D105B according to the enhancement coefficients Ken determined by the enhancement coefficient determination means 302.

The local contrast enhancement means 303 includes a delay means 331, a nonlinear LPF means 332, and a gain determination means 333.

These means have the same configuration as the delay means 131, nonlinear LPF means 132, and gain determination means 133, but instead of the intermediate image D105, the luminance image D307 is input, and the same processing as described in the second embodiment is performed on the luminance image D307.

The delay means 331, nonlinear LPF means 332, and gain determination means 333 constitute a gain generation means 336 for generating a gain on the basis of the luminance image D307.

The local contrast enhancement means 303 further includes delay means 131R, 131G, 131B.

These delay means 131R, 131G, 131B, each have the same configuration as the delay means 331, but respectively receive the red, green, and blue intermediate images D105R, D105G, D105B, and output signals D131R, D131G, D131B delayed by the same delay time as in delay means 331.

Multipliers 134R, 134G, 134B respectively multiply the delayed signals D131R, D131G, D131B from the delay means 131R, 131G, 131B by the gain G for each pixel and generate output images Rout, Gout, Bout.

According to the enhancement coefficients Ken determined in the enhancement coefficient determination means 302, the noise reduction coefficient generation means 304 generates noise reduction coefficients (NR coefficients) Knr with which the 3-D noise reduction means 105R, 105G, 105B perform noise reduction.

The frame memory 306 the stores the noise reduction coefficients Knr generated in the noise reduction coefficient generation means 304 for the pixels in one frame.

The noise reduction coefficients Knr stored in the frame memory 306 are used in the 3-D noise reduction means 105R, 105G, 105B in processing the pixels in the next frame.

Instead of the luminance signal D307 obtained from the color signals Rin, Gin, Bin, a luminance signal generated by a different method may be used. For example, if the color signals Rin, Gin, Bin have been obtained from a luminance signal Yin and color difference signals Cbin, Crin, the original luminance signal Yin may be used by the low contrast area detection means 301 and gain generation means 336.

As described above, according to the fourth embodiment, the same effects as in the second embodiment are obtained, and since contrast enhancement and noise reduction are performed on all of the color images by use of the gain G and noise reduction coefficients Knr determined on the basis of the luminance image, it is also possible to improve the image without impairing its color balance.

As described above, in the third and fourth embodiments, the detection of low contrast parts and determination of the enhancement coefficient Ken, gain G, and noise reduction coefficient Knr are performed on the basis of a luminance signal Yin (a first image signal) representing a luminance component (a first component) of the image, and local contrast enhancement with the determined gain G and noise reduction with the noise reduction coefficient Knr are performed for the color signals (each can be called a 'second image signal') respectively representing red (R), green (G), blue (B) color components (each can be called a 'second component') of the same image. When the input image signal consists of a luminance signal Y and color difference signals Cb, Cr, it is also permissible to detect low contrast areas and determine the enhancement coefficients Ken, gain G, and noise reduction coefficients Knr on the basis of the luminance signal Y (the first image signal), and perform local contrast enhancement with the determined gain G and noise reduction with the noise reduction coefficient Knr on the luminance signal Y and color difference signals Cb, Cr (each can be called the 'second image signal'). Generally speaking, the detection of low contrast parts and the determination of the enhancement coefficients Ken, the gain G, and the noise reduction coefficients Knr can be performed on the basis of a first image signal representing a first component of the image, and local contrast enhancement using the determined gain G and noise reduction using the noise reduction coefficient Knr can be performed on a second image signal representing a second component of the same image. In other words, the image or image signal (the first image signal) used to determine the enhancement coefficients Ken, gain G, and noise reduction coefficients Knr and the image or image signal (the second image signal) that is subjected to local contrast enhancement and 3-D noise reduction using the determined gain G and noise reduction coefficient Knr need not be the same.

The noise reduction coefficient generation means may be placed in a stage following the local contrast enhancement means (3, 203) as in the first and third embodiments, or in a stage preceding the local contrast enhancement means (103, 303) as in the second and fourth embodiments. When it is placed in the following stage, the image signal (third image signal) input to the 3-D noise reduction means (5, 5R, 5G, 5B) is a signal representing an image that has undergone contrast enhancement by the local contrast enhancement means (3, 203).

When the 3-D noise reduction means is placed in the stage following the local contrast enhancement means, the image signal (the second image signal) input to the local contrast enhancement means (3, 203) may be the same as the first image signal (Din) as in the first embodiment, or may be a signal (Rin, Gin, Bin) different from the first image signal (Yin) as in the third embodiment.

When the 3-D noise reduction means is placed in the stage preceding the local contrast enhancement means, the signal representing the image in which noise has been reduced by the 3-D noise reduction means (105, 105R, 105G, 105B) is input to the enhancement coefficient determination means (102, 302) as the first image signal. In this case, the image signal (the second image signal) input to the local contrast enhancement means (103, 303) may be the same as the first image signal (D105) as in the second embodiment, or may be a signal (D105R, D105G, D105B) different from the first image signal (D307), as in the fourth embodiment.

In the first to fourth embodiments, the term ' . . . means' may be either a means for performing a function through electrical circuitry or a means for performing a function by use of software. Although this invention has been described as an image processing device, the image processing method executed in the image processing device also forms part of the invention. In addition, a program functioning as each means of the image processing device or a program for making a computer execute the process in each step of the image processing method, and computer-readable recording media in which such computer programs are recorded also constitute part of the invention.

REFERENCE CHARACTERS

1, 105, 205, 305 enhancement coefficient determination means 2, 102, 202, 302 enhancement coefficient determination means, 3, 103, 203, 303 local contrast enhancement means, 31, 31R, 31G, 31B, 131, 131R, 131G, 131B, 231, 331 delay means, 32, 132, 232, 332 nonlinear LPF means, 33, 133, 233, 333 gain determination means, 34, 34R, 34G, 34B, 134, 134R, 134G, 134B multiplier, 4, 104 noise reduction coefficient generation means, 5, 5R, 5G, 5B, 105, 105R, 105G, 105B 3-D noise reduction means, 51, 151 adder, 52, 152 multiplier, 53, 153 subtractor, 54, 154 frame memory, 106 frame memory, S1, S101 low contrast area detection step, S2, S102 enhancement coefficient determination step, S3, S103 local contrast enhancement step, S4, S104 noise reduction coefficient generation step, S5, S105 3-D noise reduction step, S106 frame memory storage step.

What is claimed is:

1. An image processing device comprising:
   a 3-D noise reduction unit configured to take each pixel in an input image as a pixel to be corrected and smooth the input image in a time direction over a plurality of frames, thereby performing noise reduction of a noise component of the pixel to be corrected, and output a 3-D noise-reduced image;
   a low contrast area detection unit configured to detect a contrast correlation value of a surrounding area of the pixel to be corrected in the 3-D noise-reduced image;
   an enhancement coefficient determination unit configured to determine a contrast enhancement coefficient for the pixel to be corrected according to the contrast correlation value detected by the low contrast area detection unit;
   a local contrast enhancement unit configured to enhance contrast of a local area of the pixel to be corrected in the 3-D noise-reduced image according to the enhancement coefficient determined by the enhancement coefficient determination unit and output a local contrast enhanced image signal;
   a noise reduction coefficient generation unit configured to generate a noise reduction coefficient that increases as the enhancement coefficient determined by the enhancement coefficient determination unit increases; and
   a first frame memory that stores the noise reduction coefficients generated in the enhancement coefficient determining unit for the pixels in one frame; wherein
   the 3-D noise reduction unit controls a degree of the noise reduction for the pixel to be corrected according to the noise reduction coefficients stored in the first frame memory for each pixel one frame before.

2. The image processing device of claim 1, wherein the low contrast area detection unit outputs, as the contrast correlation value, a value that is small when a contrast of the surrounding area centered of the pixel to be corrected is low and is large when the contrast of the surrounding area centered on the pixel to be corrected is high.

3. The image processing device of claim 1, wherein for each pixel in a given range centered on the pixel to be corrected, the low contrast area detection unit obtains a standard deviation of values of all pixels in a window of a given size centered on said each pixel, and takes, as the contrast correlation value, an average of the standard deviations obtained for all pixels in the given range.

4. The image processing device of claim 1, wherein the noise reduction coefficient generation unit
   determines the noise reduction coefficient in such a way that an amount of SNR improvement responsive to the noise reduction coefficient in the 3-D noise reduction unit corresponds to an amount of SNR degradation responsive to the enhancement coefficient in the local contrast enhancement unit.

5. The image processing device of claim 1, wherein the noise reduction coefficient generation unit
   generates the noise reduction coefficient with characteristics such that the noise reduction coefficient is small when the enhancement coefficient is small, the noise reduction coefficient is large when the enhancement coefficient is large, and an increment of the noise reduction coefficient decreases as the enhancement coefficient increases.

6. The image processing device of claim 1, wherein the 3-D noise reduction unit includes:
   a frame memory that stores at least one frame of an image signal output from the 3-D noise reduction unit;

a first subtractor that subtracts, from the input image, the image signal that was output one frame before and stored in the frame memory;
a coefficient multiplier that multiplies the output of the first subtractor by the noise reduction coefficient generated by the noise reduction coefficient generation unit; and
a second subtractor that subtracts the output of the coefficient multiplier from the input image, wherein
the output of the second subtractor is used as the image signal output from the 3-D noise reduction unit.

7. The image processing device of claim 6, wherein the noise reduction coefficient generation unit generates the noise reduction coefficient in such a way that if
Ken is the enhancement coefficient,
Knr is the noise reduction coefficient, and
k is an arbitrary proportionality constant, then the relationship in the following expression is satisfied:

$$Knr = k \cdot \frac{Ken - 1}{Ken + 1} \qquad \text{[Expression 18]}$$

8. The image processing device of claim 1, wherein the enhancement coefficient determination unit determines the enhancement coefficient from characteristics such that:
the enhancement coefficient is large when the contrast correlation value is small;
the enhancement coefficient is small when the contrast correlation value is large; and
an increment of the enhancement coefficient increases as the contrast correlation value decreases.

9. The image processing device of claim 1, wherein the enhancement coefficient determination unit determines the enhancement coefficient in such a way that if
CT is the contrast correlation value,
Ken is the enhancement coefficient,
Kmax is a maximum value of the enhancement coefficient,
Kmin is a minimum value of the enhancement coefficient, and
CTtp is the contrast correlation value at a transition point of variation in the enhancement coefficient, then the relationships in the following expression are satisfied:

$$Ken = \begin{cases} \dfrac{Kmax}{1 + \left(\dfrac{Kmax}{Kmin} - 1\right) \cdot \dfrac{CT}{CTtp}} & \text{if } 0 \le CT \le CTtp \\ Kmin & \text{if } CTtp < CT \end{cases} \qquad \text{[Expression 19]}$$

10. The image processing device of claim 1, wherein the local contrast enhancement unit comprises:
a nonlinear LPF unit configured to use values obtained by nonlinear conversion of values of pixels located around the pixel to be corrected in the 3-D noise-reduced image, the conversion being responsive to differences between a value of the pixel to be corrected and the values of the pixels located around the pixel to be corrected, to smooth the pixel to be corrected and the pixels located around the pixel to be corrected, and output a result of the smoothing as a nonlinear smoothing result for the pixel to be corrected;
a gain determination unit configured to use the output of the nonlinear LPF unit, the value of the pixel to be corrected in the 3-D noise-reduced image, and the enhancement coefficient to determine a gain to be input to the local contrast enhancement unit; and
a gain multiplier that multiplies the value of the pixel to be corrected in the 3-D noise-reduced image by the gain.

11. An image processing device comprising:
a 3-D noise reduction unit configured to take each pixel in an input image as a pixel to be corrected and smooth a signal of each color component of the input image in a time direction over a plurality of frames, thereby performing noise reduction of a noise component of the pixel to be corrected, and output the signal of each color component of a 3-D noise-reduced image;
a luminance image generation unit configured to generate a luminance signal of the 3-D noise-reduced image from the signals of the color components of the 3-D noise-reduced image;
a low contrast area detection unit configured to detect a contrast correlation value of a surrounding area of the pixel to be corrected in the luminance signal of the 3-D noise-reduced image;
an enhancement coefficient determination unit configured to determine a contrast enhancement coefficient for the pixel to be corrected according to the contrast correlation value detected by the low contrast area detection unit;
a local contrast enhancement unit configured to enhance contrast of a local area of the pixel to be corrected in the signal of each color component of the 3-D noise-reduced image according to the enhancement coefficient determined by the enhancement coefficient determination unit;
a noise reduction coefficient generation unit configured to generate a noise reduction coefficient that increases as the enhancement coefficient determined by the enhancement coefficient determination unit increases; and
a first frame memory that stores the noise reduction coefficients generated in the noise reduction coefficient generation unit for the pixels in one frame; wherein
the 3-D noise reduction unit controls a degree of the noise reduction for the pixel to be corrected according to the noise reduction coefficients stored in the first frame memory for each pixel one frame before; and
the local contrast enhancement unit further comprises
a nonlinear LPF unit configured to use values obtained by nonlinear conversion of values of pixels located around the pixel to be corrected in the luminance signal of the 3-D noise-reduced image, the conversion being responsive to differences between a value of the pixel to be corrected and the values of the pixels located around the pixel to be corrected, to smooth the pixel to be corrected and the pixels located around the pixel to be corrected, and outputs a result of the smoothing as a nonlinear smoothing result for the pixel to be corrected,
a gain determination unit that uses the output of the nonlinear LPF unit, the value of the pixel to be corrected in the luminance signal of the 3-D noise-reduced image, and the enhancement coefficient to determine a gain to be input to the local contrast enhancement unit, and
a gain multiplier that multiplies the value of the pixel to be corrected in the signal of each color component of the 3-D noise-reduced image by the gain.

12. An image processing method comprising:
a 3-D noise reduction step of taking each pixel in an input image as a pixel to be corrected and smoothes the input image in a time direction over a plurality of frames, thereby performing noise reduction of a noise component of the pixel to be corrected, and outputting a 3-D noise-reduced image;

a low contrast area detection step of detecting a contrast correlation value of a surrounding area of the pixel to be corrected in the 3-D noise-reduced image;

an enhancement coefficient determination step of determining a contrast enhancement coefficient for the pixel to be corrected according to the contrast correlation value detected in the low contrast area detection step;

a local contrast enhancement step of enhancing contrast of a local area of the pixel to be corrected in the 3-D noise-reduced image according to the enhancement coefficient determined in the enhancement coefficient determination step;

a noise reduction coefficient generation step of generating a noise reduction coefficient that increases as the enhancement coefficient determined in the enhancement coefficient determination step increases; and a step of storing, in a first frame memory, the noise reduction coefficients generated in the enhancement coefficient determining step of the pixels in one frame; wherein the 3-D noise reduction step controls a degree of the noise reduction for the pixel to be corrected according to the noise reduction coefficients stored in the first frame memory for each pixel one frame before.

13. An image processing method comprising:

a 3-D noise reduction step of taking each pixel in an input image as a pixel to be corrected and smoothing a signal of each color component of the input image in a time direction over a plurality of frames, thereby performing noise reduction of a noise component of the pixel to be corrected, and outputting the signal of each color component of a 3-D noise-reduced image;

a luminance image generation step of generating a luminance signal of the 3-D noise-reduced image from the signals of the color components of the 3-D noise-reduced image;

a low contrast area detection step of detecting a contrast correlation value of a surrounding area of the pixel to be corrected in the luminance signal of the 3-D noise-reduced image;

an enhancement coefficient determination step of determining a contrast enhancement coefficient for the pixel to be corrected according to the contrast correlation value detected in the low contrast area detection step;

a local contrast enhancement step of enhancing contrast of a local area of the pixel to be corrected in the signal of each color component of the 3-D noise-reduced image according to the enhancement coefficient determined in the enhancement coefficient determination step;

a noise reduction coefficient generation step of generating a noise reduction coefficient that increases as the enhancement coefficient determined in the enhancement coefficient determination step increases; and a step of storing, in a first frame memory, the noise reduction coefficients generated in the noise reduction coefficient generation step of the pixels in one frame; wherein the 3-D noise reduction step controls a degree of the noise reduction for the pixel to be corrected according to the noise reduction coefficients stored in the first frame memory for each pixel one frame before; and the local contrast enhancement step further comprises a nonlinear LPF step of using values obtained by nonlinear conversion of values of pixels located around the pixel to be corrected in the luminance signal of the 3-D noise-reduced image, the conversion being responsive to differences between a value of the pixel to be corrected and the values of the pixels located around the pixel to be corrected, to smooth the pixel to be corrected and the pixels located around the pixel to be corrected, and outputting a result of the smoothing as a nonlinear smoothing result for the pixel to be corrected, a gain determination step of using the output of the nonlinear LPF step, the value of the pixel to be corrected in the luminance signal of the 3-D noise-reduced image, and the enhancement coefficient to determine a gain to be input to the local contrast enhancement step, and a gain multiplication step of multiplying the value of the pixel to be corrected in the signal of each color component of the 3-D noise-reduced image by the gain.

* * * * *